US010664695B2

(12) United States Patent
Ric et al.

(10) Patent No.: US 10,664,695 B2
(45) Date of Patent: May 26, 2020

(54) SYSTEM AND METHOD FOR MANAGING DIGITAL INK TYPESETTING

(71) Applicant: MyScript, Nantes (FR)

(72) Inventors: Fabien Ric, Nantes (FR); Robin Melinand, Nantes (FR); Romain Bednarowicz, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 15/466,346

(22) Filed: Mar. 22, 2017

(65) Prior Publication Data
US 2018/0114059 A1    Apr. 26, 2018

(30) Foreign Application Priority Data

Oct. 26, 2016    (EP) .................................... 16290205

(51) Int. Cl.
*G06K 9/00*    (2006.01)
*G06K 9/34*    (2006.01)
(Continued)

(52) U.S. Cl.
CPC ....... *G06K 9/00422* (2013.01); *G06F 40/109* (2020.01); *G06F 40/171* (2020.01);
(Continued)

(58) Field of Classification Search
CPC ...... G06K 9/00422; G06K 9/52; G06K 9/344; G06K 9/00409; G06K 2209/01
See application file for complete search history.

(56) References Cited

U.S. PATENT DOCUMENTS

| 5,745,600 A | * | 4/1998 | Chen | ........................ | G06K 9/72 |
| | | | | | 382/218 |
| 8,416,243 B2 | * | 4/2013 | Plummer | .............. | G06F 17/214 |
| | | | | | 345/467 |

(Continued)

FOREIGN PATENT DOCUMENTS

| EP | 1486883 | 12/2004 |
| EP | 1538549 | 6/2005 |

OTHER PUBLICATIONS

International Search Report issued for PCT/EP2017/001258 dated Feb. 6, 2018 (5 pages).

(Continued)

*Primary Examiner* — Ming Y Hon
(74) *Attorney, Agent, or Firm* — McDermott Will & Emery LLP

(57) ABSTRACT

A system, method and computer program product for managing typesetting of digital ink structured content on computing devices. Each computing device has a processor and at least one system application for recognizing handwriting input under control of the processor. The system application determines dimensional information of at least digital ink text elements of structured content, calculates a first font size for each typeset ink text element respectively corresponding to the digital ink text elements based on at least part of the dimensional information, categorizes the typeset ink text elements into one or more categories of the structured content, determines a second font size for each typeset ink text element based on the first font size of each typeset ink text element of the respective category, and display, on a display associated with the computing device, the typeset ink text elements at the respective determined second font sizes.

18 Claims, 25 Drawing Sheets

(51) Int. Cl.
 G06F 40/109 (2020.01)
 G06F 40/171 (2020.01)
 G06K 9/52 (2006.01)
(52) U.S. Cl.
 CPC ..... *G06K 9/00409* (2013.01); *G06K 9/00865* (2013.01); *G06K 9/344* (2013.01); *G06K 9/52* (2013.01); *G06K 2209/01* (2013.01)

(56) References Cited

U.S. PATENT DOCUMENTS

| | | | |
|---|---|---|---|
| 9,237,255 B1* | 1/2016 | Gopalkrishnan | H04N 1/40068 |
| 2002/0107885 A1* | 8/2002 | Brooks | G06F 3/04883 |
| | | | 715/224 |
| 2005/0135678 A1* | 6/2005 | Wecker | G06F 3/04883 |
| | | | 382/186 |
| 2005/0206627 A1* | 9/2005 | Simmons | G06F 3/04812 |
| | | | 345/179 |
| 2008/0104020 A1* | 5/2008 | Kato | G06F 17/30637 |
| 2010/0246964 A1* | 9/2010 | Matic | G06K 9/00422 |
| | | | 382/185 |
| 2011/0025719 A1* | 2/2011 | Yanase | G06F 3/0481 |
| | | | 345/667 |
| 2015/0073779 A1 | 3/2015 | Ahn et al. | |
| 2017/0075873 A1* | 3/2017 | Shetty | G06F 17/243 |
| 2018/0004397 A1* | 1/2018 | Mazzocchi | G06K 9/18 |

OTHER PUBLICATIONS

Written Opinion of the International Searching Authority issued for PCT/EP2017/001258 dated Feb. 6, 2018 (10 pages).
"Intelligent Mind-mapping", Nov. 28, 2007, Vincent Chik et al., Computer-Human Interaction, ACM, pp. 195-198.
"Recognition and beautification of multi-stroke symbols in digital ink", Aug. 1, 2005, Heloise Hwawen Hse et al., Computers and Graphics vol. 29 (2005) pp. 533-546.

* cited by examiner

SYSTEM AND METHOD FOR MANAGING DIGITAL INK TYPESETTING

CROSS-REFERENCE TO RELATED APPLICATIONS

This application claims priority to European Application No. 16 290 205.0 filed on Oct. 26, 2016, the entire contents of which is incorporated by reference herein.

TECHNICAL FIELD

The present description relates generally to the field of computing device interfaces capable of recognizing user input handwriting of various graphics and text. In particular, the present description relates to the management of typesetting of digital ink corresponding to handwritten input.

BACKGROUND

Computing devices continue to become ubiquitous to daily life. They take the form of computer desktops, laptop computers, tablet computers, hybrid computers (2-in-1s), e-book readers, mobile phones, smartphones, wearable computers, global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input interface that senses gestures made by a user above the input interface. A further input device is a position detection system which detects the relative position of either touch or non-touch interactions with a non-touch physical or virtual surface. Any of these methods of input can be used generally for the input of handwritten content. The user's handwriting is interpreted using a handwriting recognition system or method.

One application of handwriting recognition in computing devices is in the creation of diagrams which are hand-drawn on a computing device to be converted into typeset versions. Diagrams are drawings that explain or show arrangement and relations (as of parts). Diagrams generally include shapes having arbitrary or specific meanings and text with relationships to these shapes. There are many type of diagrams, such as flowcharts, organizational charts, concept maps, spider maps, block/architecture diagrams, mind-maps, block diagrams, Venn diagrams and pyramids, to name but a few.

Generally, diagrams are created to have shape elements containing text. In conventional digital (e.g., non-handwriting) diagramming applications, the size of the typeset text (e.g., the font size) within the shape containers is governed by pre-set parameters. For example, in MICROSOFT® POWERPOINT®, GOOGLE® Drawings and GOOGLE® Slides settings can be made by users to wrap text within shapes, reduce the font size when the shape size is reduced, or resize the shape when overflowing text is input. It is problematic however to apply such operations on the text and shapes of handwritten diagrams.

This is because, with respect to the digital ink (i.e., the rendered visualization of the input handwriting) version of the diagram it is difficult to resize the text and non-text in digital ink without distorting the handwriting, which adversely impacts on user experience and on the content itself since additional user effort is required with possible reduction in quality. Further, if such operations are not carried out on the digital ink but are carried out for the typeset content upon conversion of the digital ink, the resulting typeset version of the diagram may be quite different to the originally intended diagram.

Further issues exist with respect to hierarchical structures (e.g., trees) within diagrams. That is, many diagram types have levels of information, such as organizational charts, mind-maps, etc., in which each level of information is displayed in a way which visually represents the level order. In such cases, with respect to the typeset version of the diagram the different levels of the hierarchy are easily rendered with text sizes and shape sizes that are specific for the level through pre- or post-selection by users, the use of style templates and the like, or interpretation of the content. However, representing such hierarchical levels in digital ink is difficult because as the Applicant has found, the handwriting of users without and within such different levels varies to a great degree (for example, it has been noted that users cramp handwriting to fit within already drawn shapes), such that any intended differentiation in element size is difficult to interpret through the handwriting recognition process itself. That is, if the height (or size) of the digital ink is mapped directly to font size when typesetting, the converted content may have many different font sizes for similar blocks (levels) and perhaps reversed font sizes for different levels, e.g., higher levels have smaller font size than lower levels. This can be corrected post-typesetting through intervention by users, e.g., via block or menu selection, however this reduces user experience and productivity. Alternatively, a default or standard font size can be applied across all levels or individually for each level regardless of the handwritten text size.

Another application of handwriting recognition in computing devices is in the creation of tables, and the input of content and data into tables, or other structured content, like lists. Like diagrams, tables are created to have 'containers' corresponding to bordered or non-bordered columns and rows defining cells containing text and may have hierarchical structure, such as column and line headings which are to have font sizes or other styling differences to the body of the table. As such, like diagrams, interpreting sensible text and non-text sizing of the typeset version of the handwritten table or list input is difficult when considering the input itself.

SUMMARY

The examples of the present disclosure that are described herein below provide methods, systems and a computer program product for use in managing typesetting of handwritten input to a computing device.

In some examples, the present disclosure includes a system for managing typesetting of digital ink structured content on a computing device. The computing device may include a processor and at least one non-transitory computer readable medium for recognizing handwriting input under control of the processor. The at least one non-transitory computer readable medium may be configured to determine dimensional information of at least a plurality of digital ink text elements of structured content, calculate a first font size for each of a plurality of typeset ink text elements respectively corresponding to the digital ink text elements based on at least part of the dimensional information, categorize the typeset ink text elements into one or more categories of the structured content, determine a second font size for each of the typeset ink text elements based on the first text size of each typeset ink text element of the respective category, and cause display of, on a display associated with the respective computing device, the plurality of typeset ink text elements at the respective determined second font sizes.

The typeset ink text elements may be categorized based on the dimensional information of the corresponding digital ink text elements.

The dimensional information may include typographical information of the digital ink text elements. The typographical information may include the x-height of the digital ink text elements.

The dimensional information may be of one or more typeset ink non-text elements corresponding to one or more digital ink non-text elements of the structured content related to one or more of the digital ink text elements, and the at least one non-transitory computer readable medium may be configured to calculate each first font size of one or more of the typeset ink text elements corresponding to the one or more of the digital ink text elements by comparing a first text size calculated from the dimensional information of the respective one or more of the digital ink text elements and a second text size calculated from the dimensional information of the respective one or more of the typeset ink non-text elements.

The dimensional information may include geometrical information of the typeset ink non-text elements.

At least part of at least one of the one or more of the digital ink text elements may be contained within the related digital ink non-text element, and the first font size of the corresponding typeset ink text element may be calculated so that the typeset ink text element is fully contained by the corresponding typeset ink non-text element.

In some examples, the present disclosure includes a method for managing typesetting of digital ink structured content on a computing device. The computing device may include a processor and at least one non-transitory computer readable medium for recognizing handwriting input under control of the processor. The method may include the steps of: determining dimensional information of at least a plurality of digital ink text elements of structured content, calculating a first font size for each of a plurality of typeset ink text elements respectively corresponding to the digital ink text elements based on at least part of the dimensional information, categorizing the typeset ink text elements into one or more categories of the structured content, determining a second font size for each of the typeset ink text elements based on the first text size of each typeset ink text element of the respective category, and displaying, on a display associated with the respective computing device, the plurality of typeset ink text elements at the respective determined second font sizes.

The typeset ink text elements may be categorized based on the dimensional information of the corresponding digital ink text elements.

The dimensional information may include typographical information of the digital ink text elements. The typographical information may include the x-height of the digital ink text elements.

The dimensional information may be of one or more typeset ink non-text elements corresponding to one or more digital ink non-text elements of the structured content related to one or more of the digital ink text elements, and the memory may include the step of calculating each first font size of one or more of the typeset ink text elements corresponding to the one or more of the digital ink text elements by comparing a first text size calculated from the dimensional information of the respective one or more of the digital ink text elements and a second text size calculated from the dimensional information of the respective one or more of the typeset ink non-text elements.

The dimensional information may include geometrical information of the typeset ink non-text elements.

At least part of at least one of the one or more of the digital ink text elements may be contained within the related digital ink non-text element, and the first font size of the corresponding typeset ink text element may be calculated so that the typeset ink text element is fully contained by the corresponding typeset ink non-text element.

In some examples, the present disclosure includes a non-transitory computer readable medium having a computer readable program code embodied therein. The computer readable program code may be adapted to be executed to implement a method for managing typesetting of digital ink structured content on a computing device. The computing device may include a processor and at least one non-transitory computer readable medium for recognizing handwriting input under control of the processor. The method may include the steps of: determining dimensional information of at least a plurality of digital ink text elements of structured content, calculating a first font size for each of a plurality of typeset ink text elements respectively corresponding to the digital ink text elements based on at least part of the dimensional information, categorizing the typeset ink text elements into one or more categories of the structured content, determining a second font size for each of the typeset ink text elements based on the first text size of each typeset ink text element of the respective category, and displaying, on a display associated with the respective computing device, the plurality of typeset ink text elements at the respective determined second font sizes.

The typeset ink text elements may be categorized based on the dimensional information of the corresponding digital ink text elements.

The dimensional information may include typographical information of the digital ink text elements. The typographical information may include the x-height of the digital ink text elements.

The dimensional information may be of one or more typeset ink non-text elements corresponding to one or more digital ink non-text elements of the structured content related to one or more of the digital ink text elements, and the memory may include the step of calculating each first font size of one or more of the typeset ink text elements corresponding to the one or more of the digital ink text elements by comparing a first text size calculated from the dimensional information of the respective one or more of the digital ink text elements and a second text size calculated from the dimensional information of the respective one or more of the typeset ink non-text elements.

The dimensional information may include geometrical information of the typeset ink non-text elements.

At least part of at least one of the one or more of the digital ink text elements may be contained within the related digital ink non-text element, and the first font size of the corresponding typeset ink text element may be calculated so that the typeset ink text element is fully contained by the corresponding typeset ink non-text element.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

Figure 1:
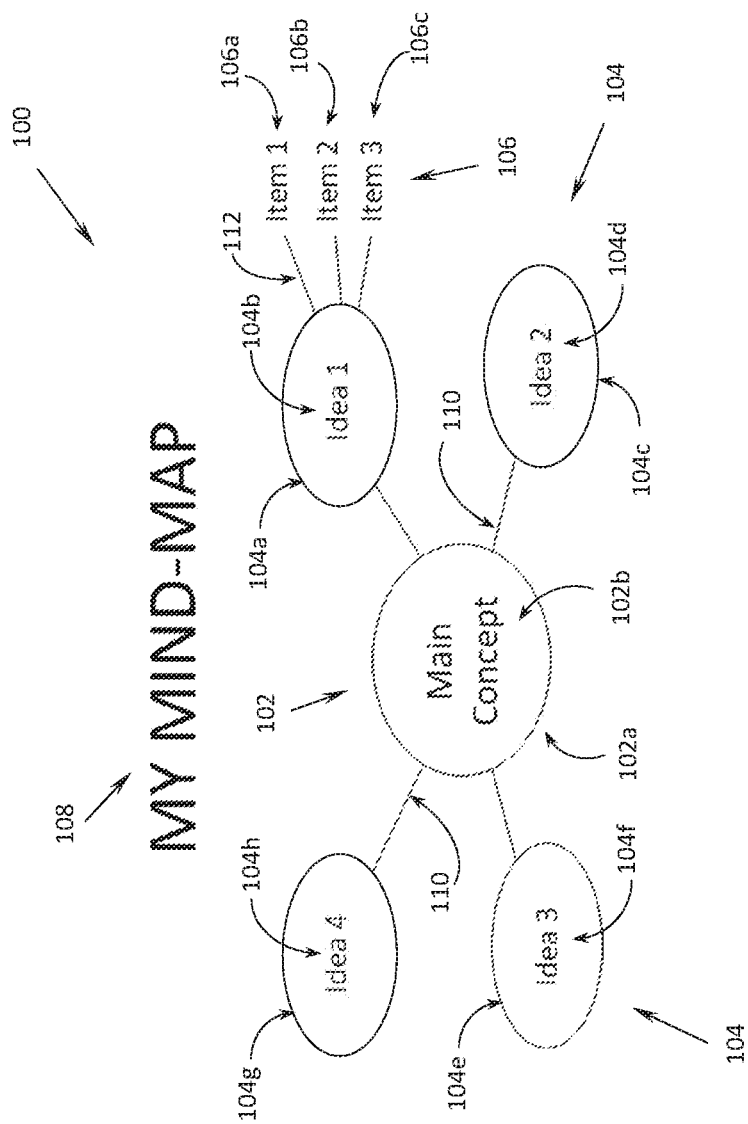
FIG. 1 shows example structured digital object content in the form of a typeset ink mind-map diagram rendered on an input interface of a computing device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input interface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input interface, such as a touch sensitive screen, connected to, or of, the computing device or via an input device, such as a digital pen or mouse, connected to the computing device or via a physical or virtual surface monitored by a position detection system.

Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye. The term "digital" is used herein to define computing media and content, in differentiation to analog media and content, such as paper and paper ink. This term is not intended to define the manner of computing processing, e.g., binary, used by any applicable devices, and can be interchanged with "electronic" or like terms.

FIG. 1 illustrates a mind-map diagram 100 having (hierarchical) diagram elements as an example of structured digital object content with typeset ink text elements and typeset ink non-text elements. The diagram 100 has a number of elements distributed in nodes: a (first level) central or main node 102 (node "1"), a number of (second level) branched nodes 104 (node "2") and a number of (third level) branched or list nodes 106 (node "3"). The diagram 100 further has a title element or node 108 (node "0") which includes text, e.g., the words "MY MIND-MAP".

The (first level) node 102 includes a shape 102a, e.g., an oval, containing text 102b, e.g., the words or phrase "Main Concept", such that the shape 102a is a container.

The first (second level) node 104 includes a shape 104a, e.g., an oval, containing text 104b, e.g., the combination of words and numbers or phrase "Idea 1", the second (second level) node 104 includes a shape 104c, e.g., an oval, containing text 104d, e.g., the combination of words and numbers or phrase "Idea 2", the third (second level) node 104 includes a shape 104e, e.g., an oval, containing text 104f, e.g., the combination of words and numbers or phrase "Idea 3" and the fourth (second level) node 104 includes a shape 104g, e.g., an oval, containing text 104h, e.g., the combination of words and numbers or phrase "Idea 4" respectively, such that the shapes are containers.

The first (third level) node 106 includes text 106a, e.g., the combination of words and numbers or phrase "Item 1", the second (third level) node 106 includes text 106b, e.g., the combination of words and numbers or phrase "Item 2" and third (third level) node 106 includes text 106*c*, e.g., the combination of words and numbers or phrase "Item 3", which together form a list.

Further, the second level containers 104 are each connected to the first level container 102 with respective connectors 110, and the third level list elements 106 are each connected to one of the second level containers 104 with respective connectors 112.

The meaning of a hierarchical structure with respect to the example mind-map diagram 100 is that the second level elements depend from the first level element, e.g., the "ideas" are those formed from the "main concept", and the third level elements depend from one of the second level elements, e.g., the "items" are related to one of the "ideas". The diagram 100 is rendered or formatted in typeset ink, for example on the screen of a computing device. That is, the diagram elements of text (e.g., text characters and numbers) and non-text (e.g., the ovals and lines) are rendered as digital objects. Accordingly, visualization of the hierarchical relationships is assisted by utilizing different digital object sizes for these elements.

As can be seen, the size of the shape 102*a* and the text size of the text 102*b* of the first level node 102 are larger than those of the shapes 104*a*, 104*c*, 104*e* and 104*g* and the text 104*b*, 104*d*, 104*f* and 104*h* of the second level nodes 104, respectively. The shapes and text of the second level nodes 104 have the same shape size (and dimensions) and text size, respectively. The text size of the text 106*a*, 106*b* and 106*c* of the third level nodes 106 are the same as each other and the same as that of the text 104*b*, 104*d*, 104*f* and 104*h* of the second level nodes 104. Further, the text size of the text of the title 108 is the largest of all. In this way, the different dependent levels of the diagram 100 are easily and immediately visually discerned. Other formatting and styling is also possible to provide such visual leveling, such as line and text color, line thickness, container shading, text highlighting, animation, decoration, etc.

Figure 2:
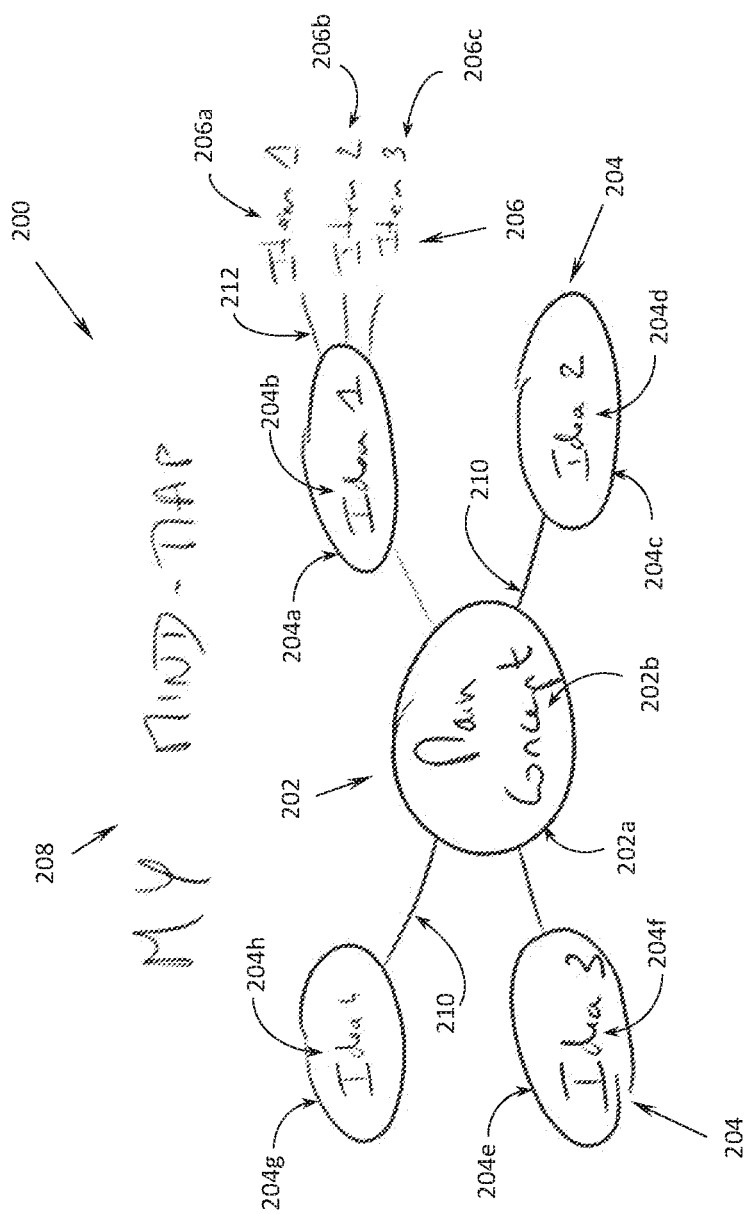
FIG. 2 shows example structured ink object content in the form of a digital ink mind-map diagram rendered on the input interface of the computing device.

FIG. 2 illustrates an example mind-map diagram 200 having hierarchical diagram elements as an example of structured ink object content. That is, the diagram 200 is rendered in digital ink with digital ink text elements and digital ink non-text elements based on handwriting input to a computing device which is handwriting recognition processed to interpret the diagrammatic relationships of the input in an example manner as follows.

Figure 3:
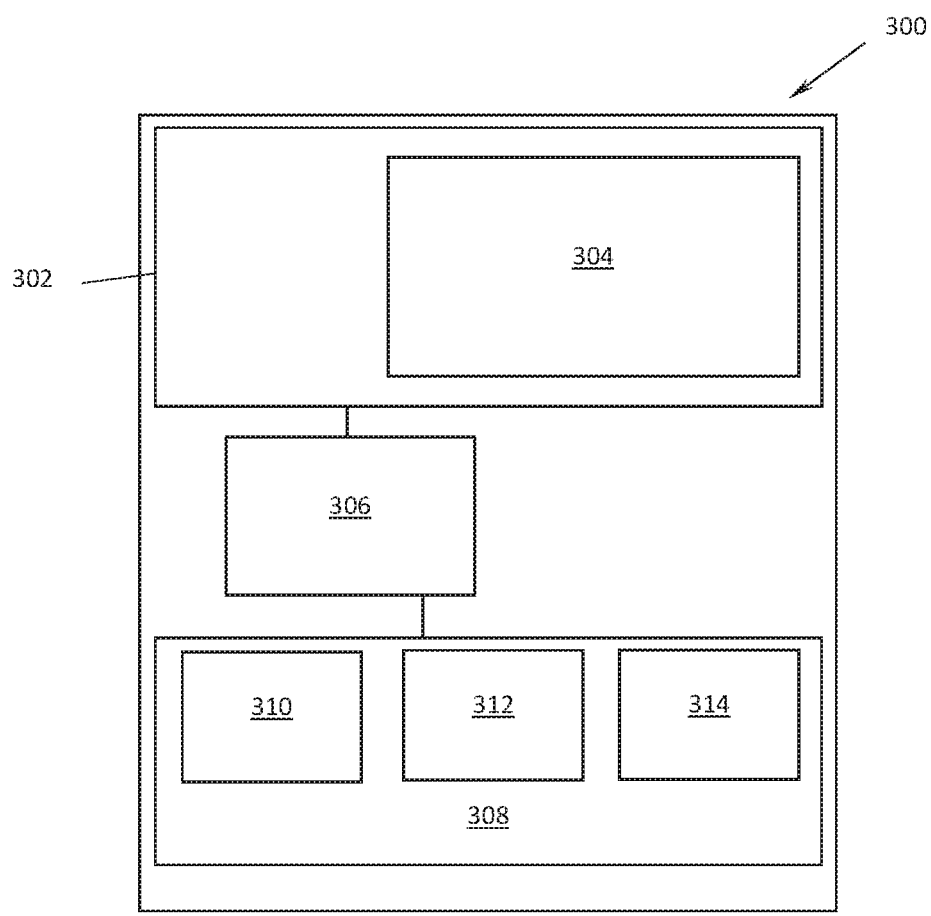
FIG. 3 shows a block diagram of the computing device in accordance with an example of the present system and method.

FIG. 3 shows a block diagram of an example computing device 300. The computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 300 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 300 has at least one display 302 for outputting data from the computing device such as images, text, and video. The display 302 may use LCD, plasma, LED, iOLED, CRT, or any other appropriate technology that is or is not touch sensitive as known to those of ordinary skill in the art. At least some of the display 302 is co-located with at least one input interface 304. The input interface 304 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input interface 304 may be bounded by a permanent or video-generated border that clearly identifies its boundaries. Instead of, or additional to, an on-board display, the computing device 300 may have a projected display capability.

The computing device 300 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 300 also includes a processor 306, which is a hardware device for executing software, particularly software stored in memory 308. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 308 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 308 may incorporate electronic, magnetic, optical, and/or other types of storage media. The memory 308 can have a distributed architecture where various components are situated remote from one another but can also be accessed by the processor 306. Further, the memory 308 may be remote from the device, such as at a server or cloud-based system, which is remotely accessible by the computing device 300. The memory 308 is coupled to the processor 306, so the processor 306 can read information from and write information to the memory 308. In the alternative, the memory 308 may be integral to the processor 306. In another example, the processor 306 and the memory 308 may both reside in a single ASIC or other integrated circuit.

The software in the memory 308 includes an operating system 310, an ink management system 312 in the form of a non-transitory computer readable medium having a computer readable program code embodied therein and a handwriting recognition (HWR) system 314. The ink management system 312 and the HWR system 314 may each include one or more separate computer programs. Each of these has an ordered listing of executable instructions for implementing logical functions. The operating system 310 controls the execution of the ink manager 312 (and the HWR system 314). The operating system 310 may be any proprietary operating system or a commercially or freely available operating system, such as WEBOS, WINDOWS®, MAC and IPHONE OS®, LINUX, and ANDROID. It is understood that other operating systems may also be utilized. Alternatively, the ink management system 312 of the present system and method may be provided without use of an operating system.

The ink management system 312 includes one or more processing elements related to detection, management and treatment of hand-drawn shapes and handwritten text input by users. The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The ink management system 312, and the other applications, include program(s) provided with the computing device 300 upon manufacture and may further include programs uploaded or downloaded into the computing device 300 after manufacture.

The HWR system 314, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F #.

Alternatively, the HWR system 314 may be a method or system for communication with a handwriting recognition system remote from the device, such as a server or cloud-based system, but is remotely accessible by the computing device 300 through communications links using the aforementioned communications I/O devices of the computing device 300. Further, the ink management system 312 and the HWR system 314 may operate together or be combined as a single system or application. Further still, the ink management system 312 and/or the HWR system 314 may be integrated within the operating system 310.

Strokes entered on or via the input interface 304 are processed by the processor 306 as digital ink. A user may enter a stroke with a finger or some instrument such as a pen or stylus suitable for use with the input interface. The user may also enter a stroke by making a gesture above the input interface 304 if technology that senses or images motion in the vicinity of the input interface 304 is being used, or with a peripheral device of the computing device 300, such as a mouse or joystick, or with a projected interface, e.g., image processing of a passive plane surface to determine the stroke and gesture signals.

A stroke is characterized by at least the stroke initiation location, the stroke termination location, and the path connecting the stroke initiation and termination locations. Further information such as timing, pressure, angle at a number of sample points along the path may also be captured to provide deeper detail of the strokes. Because different users may naturally write the same object, e.g., a letter, a shape, a symbol, with slight variations, the HWR system accommodates a variety of ways in which each object may be entered whilst being recognized as the correct or intended object.

Figure 4:
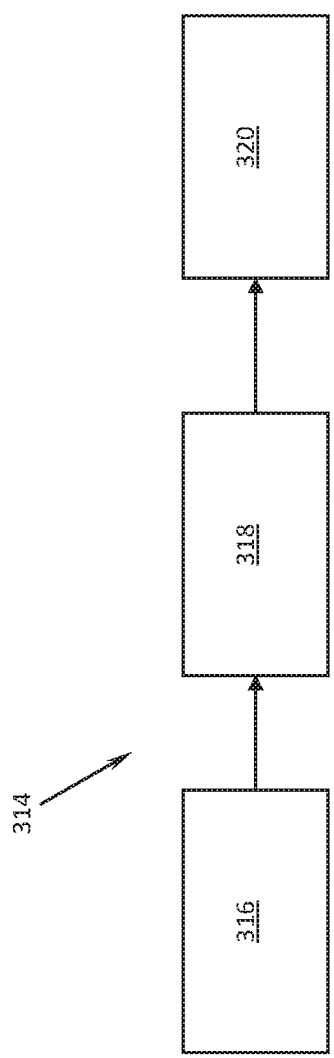
FIG. 4 shows a block diagram of a system for handwriting recognition in accordance with an example of the present system and method.

FIG. 4 is a schematic pictorial of an example of the HWR system 314, in either its local (i.e., loaded on the device 300) or remote (i.e., remotely accessible by the device 300) forms. The HWR system 314 includes stages such as pre-processing 316, recognition 318 and output 320. The preprocessing stage 316 processes the digital ink to achieve greater accuracy and reducing processing time during the recognition stage 318. This preprocessing may include normalizing of the path connecting the stroke initiation and termination locations by applying size normalization and/or methods such as B-spline approximation to smooth the input. The preprocessed strokes are then passed to the recognition stage 318 which processes the strokes to recognize the objects formed thereby. The recognized objects may then be output 320 to the display 302, generally as a digital ink or typeset ink versions of the handwritten input.

Figure 5:
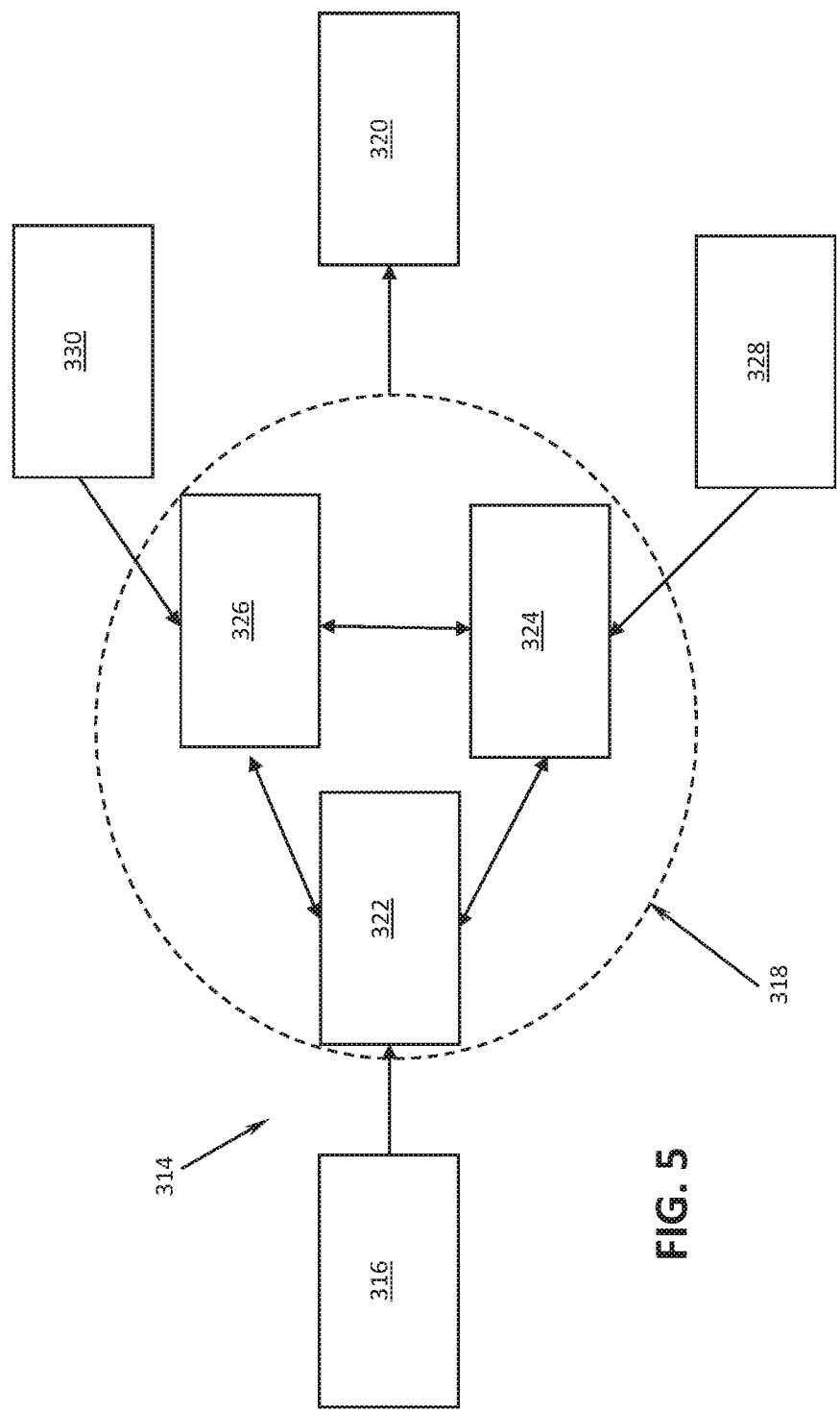
FIG. 5 shows a block diagram illustrating detail of the handwriting recognition system of FIG. 4 in accordance with an example of the present system and method.

The recognition stage 318 may include different processing elements or experts. FIG. 5 is a schematic pictorial of the example of FIG. 4 showing schematic detail of the recognition stage 318. Three experts, a segmentation expert 322, a recognition expert 324, and a language expert 326, are illustrated which collaborate through dynamic programming to generate the output 320.

The segmentation expert 322 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 322 may form the element hypotheses by grouping consecutive strokes of the original input to obtain a segmentation graph where each node corresponds to at least one element hypothesis and where adjacency constraints between elements are handled by the node connections. Alternatively, the segmentation expert 322 may employ separate experts for different input types, such as text, drawings, tables, charts, equations, and music notation.

The recognition expert 324 provides classification of the features extracted by a classifier 328 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 326 generates linguistic meaning for the different paths in the segmentation graph using language models (e.g., grammar or semantics). The expert 326 checks the candidates suggested by the other experts according to linguistic information 330. The linguistic information 330 can include a lexicon, regular expressions, etc. and is the storage for all static data used by the language expert 326 to execute a language model. A language model can rely on statistical information on a given language. The linguistic information 330 is computed off-line, with or without adaption according to the results of recognition and user interactions, and provided to the linguistic expert 326. The language expert 326 aims at finding the best recognition path. In one example, the language expert 326 does this by exploring a language model such as final state automaton (FSA) representing the content of linguistic information 330. In addition to the lexicon constraint, the language expert 326 may use a language model with statistical information modeling for how frequent a given sequence of elements appears in the specified language or is used by a specific user to evaluate the linguistic likelihood of the interpretation of a given path of the segmentation graph.

With respect to the handwritten input of FIG. 2, like the typeset ink diagram 100, the digital ink diagram 200 has a number of elements distributed in nodes: a (first level) central or main node 202, a number of second level or branched nodes 204 and a number of third level or branched (or list) nodes 206, and a title element or node 208. Accordingly, the HWR system 314 may recognize the text and non-text elements of the diagram 200 and interpret the diagrammatic relationships therebetween. This interpretation may be performed as described in U.S. patent application Ser. No. 14/955,155 filed claiming a priority date of 10 Oct. 2015 in the name of the present Applicant and Assignee, the contents of which are incorporated by reference herein. In the interests of completeness with brevity, aspects of this interpretation are described now in relation to the diagram 200.

The example diagram 200 includes handwriting input of multiple strokes representing both non-text and text. The present system and method automatically detect and differentiate the input of the different handwritten objects of shapes (and other non-text) and text so that they are processed by the HWR system 314 with suitable recognition techniques, e.g., the strokes of the detected shapes are processed using a shape language model and the strokes of the detected text are processed using a text language model. It is noted however that since many handwritten shapes and text characters can share common features (e.g., a circle and the letter "o", an arrowhead and the letter "v") users are provided with the ability to correct wrong differentiation decisions using a user interface (UI) or the like and/or such confused input may be processed using more than one language model to provide the most probable result. The preprocessing stage 316, or one or more of the stages, of the HWR system 314 may be configured to perform this disambiguation process by classifying the elements of the rendered digital ink into different classes or categories, being non-text (e.g., shape), text and a mixture of shape and text. The classified digital ink is then parsed to the recognizer 318 for suitable recognition processing depending on the classification.

For example, when processing digital ink classified as text, the recognizer 318 employs the segmentation expert 322 to segment individual strokes of the text to determine the segmentation graphs, the recognition expert 324 to assign probabilities to the graph nodes using the classifier 328, and the language expert 326 to find the best path through the graphs using, for example, a text-based lexicon of the linguistic information 330. On the other hand, when processing digital ink classified as non-text, the recognizer 318 employs the segmentation expert 322 to segment the strokes of the shape, the recognition expert 324 to determine segmentation graphs using the classifier 128, and the language expert 326 to find the best path through the graphs using a shape-based lexicon of the linguistic information 330. The mixed content classification may be treated as 'junk' and will result in low probability of recognition when parsed to the recognizer 318.

As such, the present system and method may identify: shapes that are hand-drawn alone (e.g., without associated connectors or text), as closed shapes or polygons (e.g., circles, ellipses, squares, rectangles and rhombi), and as open shapes (e.g., lines, which can be combined in the drawing of polygons); shapes that are hand-drawn surrounding one or more existing non-text and/or text elements (e.g., creating an outline or container), creating containers, and creating connectors between other non-text and text elements; text that is handwritten alone (e.g., without an outline or container), within existing shapes (e.g., within a container), and near other elements; and text elements that contain a single line of text (one or several words) or multiple lines of text (with or without carriage return, numbered lists, bullets points, etc.). With respect to the diagram 200, the various non-text and text elements are recognized as follows based on the disambiguation results.

The (first level) node 202 includes a shape 202a that is hand-drawn in a single continuous stroke, detected as non-text and recognized as an oval or ellipse, and text 202b that is handwritten in multiple strokes, detected as text and recognized as the words or phrase "Main Concept". Further, as the recognized text 202b is surrounded by the recognized shape 202a, the shape 202a is detected as a container.

The first (second level) node 204 includes a shape 204a that is hand-drawn in a single continuous stroke, detected as non-text and recognized as an oval or ellipse, and text 204b that is handwritten in multiple strokes, detected as text and recognized as the combination of words and numbers or phrase "Idea 1". Further, as the recognized text 204b is surrounded by the recognized shape 204a, the shape 204a is detected as a container.

The second (second level) node 204 includes a shape 204c that is hand-drawn in a single continuous stroke, detected as non-text and recognized as an oval or ellipse, and text 204d that is handwritten in multiple strokes, detected as text and recognized as the combination of words and numbers or phrase "Idea 2". Further, as the recognized text 204d is surrounded by the recognized shape 204c, the shape 204c is detected as a container.

The third (second level) node 204 includes a shape 204e that is hand-drawn in a single continuous stroke, detected as non-text and recognized as an oval or ellipse, and text 204f that is handwritten in multiple strokes, detected as text and recognized as the combination of words and numbers or phrase "Idea 3". Further, as the recognized text 204f is surrounded by the recognized shape 204e, the shape 204e is detected as a container.

The fourth (second level) node 204 includes a shape 204g that is hand-drawn in a single continuous stroke, detected as non-text and recognized as an oval or ellipse, and text 204h that is handwritten in multiple strokes, detected as text and recognized as the combination of words and numbers or phrase "Idea 4". Further, as the recognized text 204h is surrounded by the recognized shape 204g, the shape 204g is detected as a container.

The first (third level) node 206 includes text 206a that is handwritten in multiple strokes, detected as text and recognized as the combination of words and numbers or phrase "Item 1". The second (third level) node 206 includes text 206*b* that is handwritten in multiple strokes, detected as text and recognized as the combination of words and numbers or phrase "Item 2". The third (third level) node 206 includes text 206*c* that is handwritten in multiple strokes, detected as text and recognized as the combination of words and numbers or phrase "Item 3". Further, as the recognized text 206*a*, 206*b* and 206*c* is provided on adjacent horizontal lines, the 'text block' containing the text 206*a*, 206*b* and 206*c* may be detected as a list.

Further, between each of the second level containers 204 and the first level container 202, there are lines 210 that are hand-drawn in single continuous strokes, detected as non-text and recognized as lines. Accordingly, the lines 210 may be detected as connectors of the first and second level container 202 and 204. Furthermore, between each of the third level list elements 206 and the first (second level) container 204, there are lines 212 that are hand-drawn in single continuous strokes, detected as non-text and recognized as lines. Accordingly, the lines 212 may be detected as connectors of that second level container 204 and the third level list elements 206.

Further still, the title element 208 includes text that is handwritten in multiple strokes, detected as text and recognized as the words "MY MIND-MAP".

Such recognition and interpretation of the handwritten diagram 200 provides many benefits including the ability to directly interact with the digital ink to edit the digital ink diagram, as described in afore-incorporated by reference U.S. patent application Ser. No. 14/955,155. In the present system and method, a further benefit is in the typesetting conversion of the recognized and interpreted diagram so as provide a typeset or document version of the diagram, and other text and non-text containing content, having styling which captures and respects the diagram creator's intent.

As described in the background, typesetting may be achieved in several ways. In one example, for shapes, the size of the digital ink shape may be used to define the typeset ink shape and, for text, a single or 'normal' font size for the typeset ink text may be used as defined in a pre-determined and/or settable, such as by user interaction with the UI or the like, manner. For example, a normal font size may be provided by a document processing application which accepts the handwriting as input. Such a normal or default font size may be defined in relation to typographical elements of the document processing application, such as, for example, described in U.S. patent application Ser. No. 15/215,716 filed claiming a priority date of 25 Aug. 2015 in the name of the present Applicant and Assignee, the contents of which are incorporated by reference herein.

With respect to shapes, the typesetting can be thought of as 'beautification' of the digital ink shapes through conversion to digital objects. In the present system and method, the handwritten input may be rendered as ink objects in the manner described in U.S. patent application Ser. No. 15/083, 195 filed claiming a priority date of 7 Jan. 2016 in the name of the present Applicant and Assignee, the contents of which are incorporated by reference herein. That is, the 'raw' or input ink (e.g., the handwritten strokes) may be referenced or linked to the digital ink (e.g., the displayed ink) so that the relationship between the actual input, as recognized by the HWR system 314, and the displayed input is known by the ink management system 312. In this way, user interaction with the digital ink, for example to edit the content, is performed in relation to the underlying recognition. This 'marrying' of the recognized ink and digital ink forms the 'ink objects'. Each ink object has metadata including information similar to that of the digital objects but also further information related to the recognition processing. Further, retention of the ink objects through typesetting may be performed by merely re-rendering the digital ink as the typeset ink, rather than converted to digital objects. In this way, interactions with the typeset ink are treated by the ink management system 312 in similar fashion to the interactions with the digital ink. That is, reference is made to the related underlying recognition results such that similar functionality is provided.

Figure 6:
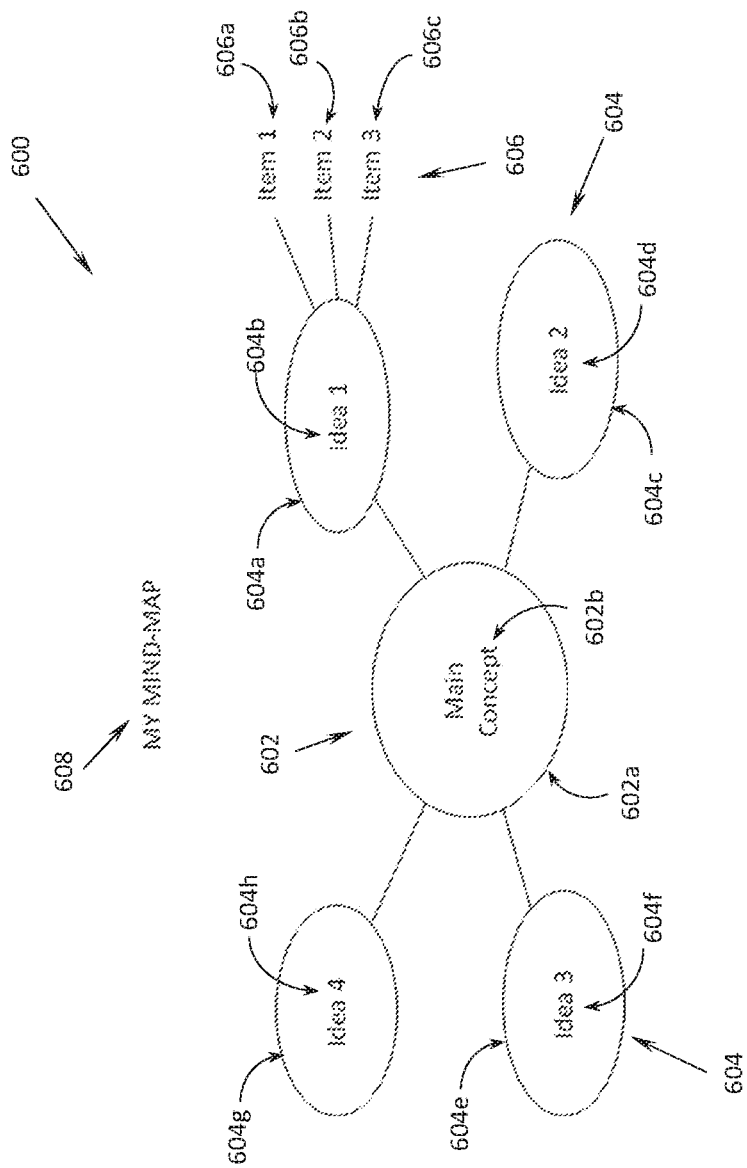
FIG. 6 illustrates an example typeset ink mind-map diagram as typeset from the digital ink mind-map diagram of FIG. 2.

FIG. 6 shows a typeset ink diagram 600 which has been typeset from the digital ink diagram 200 based on this normal or universal font size example. Like the typeset ink diagram 100, the typeset ink diagram 600 has a number of elements distributed in nodes: a (first level) central or main node 602, a number of second level or branched nodes 604 and a number of third level or branched nodes 606, and a title element 608.

As can be seen, each of the digital ink shapes 202*a*, 204*a*, 204*c*, 204*e* and 204*g* of the diagram 200 have been typeset into typeset ink shapes 602*a*, 604*a*, 604*c*, 604*e* and 604*g*, respectively, so that each of the typeset ink shapes or containers 604*a*, 604*c*, 604*e* and 604*g* of the second level nodes 604 are relatively smaller than the typeset ink shape or container 602*a* of the first level node 602. This results because the digital ink shapes 204*a*, 204*c*, 204*e* and 204*g* are relatively smaller than the digital ink shape 202*a*. Accordingly, the styling of the mind-map diagram is generally respected with the central or first level diagram element having a larger size than the second level diagram elements. However, the typeset ink shape diagram elements of the same hierarchical level are not of the same size as the digital ink shapes are of different sizes.

With respect to the text, the digital ink text 202*b*, 204*b*, 204*d*, 204*f*, 204*h*, 206*a*, 206*b*, 206*c* and 208 of the diagram 200 has been typeset into typeset ink text 602*b*, 604*b*, 604*d*, 604*f*, 604*h*, 606*a*, 606*b*, 606*c* and 608, respectively, with all of the typeset ink text having the same font size as defined. Whilst such a typeset conversion is simple to implement, the resulting typeset diagram 600 clearly does not reflect the different text sizes used in the original hand-drawn diagram 200 of the user, unlike the typeset diagram 100. In particular, relatively large containers or cells (defined in detail later) contain relatively small text, namely the container 602, and the title 608 is relatively small with respect to the rest of the text of the diagram.

Based on this undesired result it is considered that the typesetting operation should be performed in light of a (first) criteria that the typeset result should be relatively close to the user's handwritten ink input. That is, as with drawing of diagrams and other mixed text and non-text content using pen and paper, when drawing a digital diagram, etc., users emphasize certain elements, such as titles and important content in the diagram, by writing in a larger hand or font, as in the example diagram of FIG. 2. As such, in the present system and method differences in scale in the handwritten text are respected which allows, for example, for relatively larger fonts for text elements, such as titles, and hierarchical diagram elements, such as the central or first level node of the mind-map diagram of the illustrated example.

With this first criteria, in another example, for shape, the same definition is used as with the previous example, however for text, the height of the digital ink text may be used to determine styles of the typeset ink text, each having an associated font size, e.g., small, normal, large, extra-large, as defined in a pre-determined and/or settable (such as by user interaction with the UI or the like) manner. That is, each style is defined by an associated height threshold of the digital ink text, such that digital ink with a height below the lowest threshold level is classed as 'small', digital ink with a height between threshold levels is classed as 'normal' or 'large' appropriately, and digital ink with a height above the highest threshold level is classed as 'extra-large', for example.

That is, the normal size may be the normal font size defined as described earlier, and each of the other sizes, e.g., small, large and extra-large, are referenced to this normal font size with an appropriate size difference or shift, e.g., about 2 pt to about 4 pt for each level, from the normal font size based on the height of the digital ink. The height of the digital ink used may be the maximum height of the characters and the contained words as recognized by the HWR system 314, for example, or the maximum height of the recognized lower-case characters, or an average height, etc. The determination of such digital ink character size characteristics is discussed in more detail later. Alternatively, or additionally, other size characteristics of the digital ink may be used, such as width, area.

Figure 7:
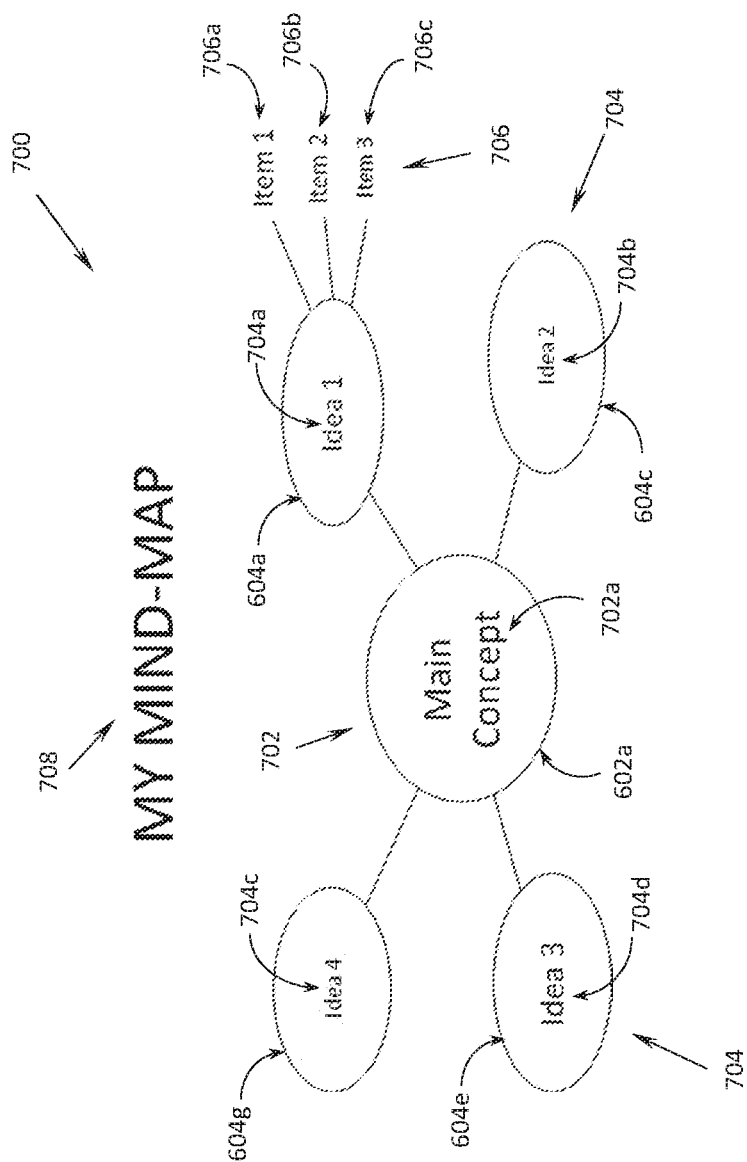
FIG. 7 illustrates an example typeset ink mind-map diagram as typeset from the digital ink mind-map diagram of FIG. 2.

FIG. 7 shows a typeset ink diagram 700 which has been typeset from the digital ink diagram 200 based on this pre-defined (leveled) font size set example. Like the typeset ink diagram 100, the typeset ink diagram 700 has a number of elements distributed in nodes: a (first level) central or main node 702, a number of second level or branched nodes 704 and a number of third level or branched nodes 706, and a title element 708.

As can be seen, each of the digital ink shapes 202*a*, 204*a*, 204*c*, 204*e* and 204*g* of the diagram 200 have been typeset into the typeset ink shapes 602*a*, 604*a*, 604*c*, 604*e* and 604*g*, respectively, as in the FIG. 6 example, and therefore have the same issues with differing dimensions.

With respect to the text, the digital ink text 202*b*, 204*b*, 204*d*, 204*f*, 204*h*, 206*a*, 206*b*, 206*c* and 208 of the diagram 200 has been typeset into typeset ink text 702*a*, 704*a*, 704*b*, 704*c*, 704*d*, 706*a*, 706*b*, 706*c* and 708, respectively, with all of the typeset ink text having a font size defined by the digital ink text it represents. This may be achieved as described in detail later. The resulting typeset diagram 700 clearly does not reflect the text sizes used in the original hand-drawn diagram 200 of the user, unlike the typeset diagram 100. In particular, the text of the same levels within the hierarchy are of different sizes, whether contained in containers or cells, such as the typeset ink text 704*a*, 704*b*, 704*c* and 704*d*, and the typeset ink text 706*a*, 706*b* and 706*c*.

Based on this undesired result it is considered that the typesetting operation should also be performed in light of a (second) criteria that the same typeset ink font size should be used for the diagram elements that have been generally handwritten at the same scale (e.g., at the same hierarchical level). As such, differences in scale in the handwritten text are respected which allows, for example, for hierarchical diagram elements, such as the branched or second and third level nodes of the mind-map diagram of the illustrated example.

By fulfilling these two criteria of:
(1) substantial differences in scale in handwritten text are respected,
(2) same font size is used for all text blocks that have been roughly handwritten with the same scale,
the font size calculation of the present system and method attributes a font size to each text block that provides meaningful visual content that respects users' intentions, such that the typeset ink diagram 100 of FIG. 1 is generated from the digital ink diagram 200 of FIG. 2, for example. The manner in which the present system and method adheres to these criteria is now described.

In the present system and method, when digital ink content including contained or non-contained text is typeset, the ink management system 312 calculates the appropriate font size(s) to be used in the typeset ink in three steps:
 local font size calculation
  calculate best-fit font size for each text block,
 categorization
  text blocks are sorted into groups based on dimensional information of at least the text,
 normalization
  font size(s) are normalized for content by considering all text blocks.

In this way, dynamic normalized font sizes are calculated based on the recognized and interpreted digital ink content. It is understood that the font size calculation of the present system and method is applicable to not only handwritten content including text and non-text, such as the diagram of the examples or tables, but also handwritten content including text only.

For the local font size calculation, the ink management system 312 calculates the font size for each block of text which has text within a container or cell, text alone or text associated with a connector as a label. To determine the font size for a text block, the ink management system 312 is configured to use information on dimensional features of the handwritten input based on recognized or determined features of the characters represented by the input as provided by the HWR system 314 together with the recognition results, and/or recognized or determined features of the shapes represented by the input as provided by the HWR system 314 together with the recognition results. That is, in the recognition process, the recognition engine 318 determines dimensional information related to typography of at least each of the recognized characters of the handwritten input and/or related to dimensions of the recognized shapes of the hand-drawn input.

Typography of text and punctuation characters includes several elements related to elements of text, including ascenders and descenders of letters. With respect to handwritten characters the HWR system 314 determines lower and upper extrema of each character. A lower extremum is the lowest point at which the stroke or strokes of a recognized character pass. An upper extremum is the highest point at which the stroke or strokes of a recognized character pass. From these extrema, writing lines at the levels of character, word (e.g., a series of characters), sentence or phrase (e.g., a series of characters and/or words), and text line (e.g., a series of characters, words and/or sentences) are determined. The writing lines include top-, lower-, base- and mid- (or median-) lines. Alternatively, or additionally, the ink management system 312 may be configured to determine these extrema itself from the recognition results or from the digital ink. Other elements of text that may be considered by the present system and method in determining the typograph may include, for example, character width, spacing, slant.

With respect to individual characters the typography information may be applied based on the type of character recognized by the HWR system 314, or otherwise determined by the ink management system 312. That is, for capitalized letters, letters having ascenders and certain punctuation marks, the top-line (or ascender height or line) is defined as the horizontal line passing through a point related to the upper extremum across the horizontal extent of the character. It is noted that for capital letters, typography may also define a cap-line which may be different than the top-line for a word to allow for certain fontifications.

For letters having descenders and certain punctuation marks, the lower-line (or descender line) is defined as the horizontal line passing through a point related to the lower extremum across the horizontal extent of the character.

The base-line is defined as the horizontal line passing through a point related to at least the lower-line across the horizontal extent of the character, and the mid-line (or x-height or line) is defined as the horizontal line passing through a point related to the top- and base-lines across the horizontal extent of the character. The determination of the points through which these lines pass is particular to the recognition process and language model(s) used by the HWR system 314.

For letters having neither descenders nor ascenders and in lower case form, the mid-line is defined as the top-line and the base-line is defined as the lower-line.

For capitalized letters, letters having ascenders and certain punctuation marks, the base-line is defined as the lower-line and the mid-line is defined as the horizontal line passing through a point which is the median distance between the top- and base-lines, for example.

For letters having descenders and certain punctuation marks, the mid-line is defined as the top-line and the base-line is defined as the horizontal line passing through a point which is the median distance, or which is defined by some other metric (such as certain geometrical features of the stoke(s) itself), between the mid- and lower-lines.

Of course, certain characters, depending on language and handwriting styles, may include both ascenders and descenders, or diacritics (such as accents), such that certain combinations or weightings of the above-described relationships are used to define the typography of the characters. Also, certain punctuation marks and other symbols may not range over more than one of the typography lines (such as full stops and hyphens), such that specific rules are applied for such characters.

For all characters of a text string in a text block, the respective typography information for each character is determined and compared or combined in order to determine the associated typography information of the entire text sting. This may be done for all of the text regardless of the number of text lines in the text string, or may be done on a line-by-line basis (as described later). That is, the top-line for all of the text may be defined at the character having the highest ascender, the lower-line for all of the text may be defined at the character having the lowest descender, the base-line for all of the text may be defined at the character(s) having the lowest point that is not a descender (e.g., the character does not descend beneath the line of text or does not descend therebelow by a certain extent), and the mid-line for all of the text may be defined at the mid-point between the top- and lower-lines. Alternatively, one or more of these lines may be defined at an average or median point of the characters of all of the text. Using such average or median determinations may provide for some resistance to jagged or slanted handwriting in which the characters are not substantially horizontally aligned.

Figure 8:
FIG. 8 shows example handwritten input rendered as digital ink on the input interface of the computing device depicting dimensional information of the digital ink determined in accordance with an example of the present system and method.

For example, FIG. 8 shows example handwritten input 800 rendered as digital ink on the input interface 304 of the device 300, for example. The handwritten input 800 is handwritten in multiple strokes, detected as text and recognized as the word "flower" written in one line of text. As can be seen, the handwriting input 800 includes a character having both an ascender and a descender, i.e., the "f", a character having an ascender, i.e., the "l", and characters having neither ascenders nor descenders, i.e., the "o", "w", "e" and "r".

For this example text 800, as shown, the top-line TL may be determined at the upper extent of the ascender of the letter "f", the lower-line LL may be determined at the lower extent of the descender of the letter "f", the base-line BL may be determined at the average of the lowest non-descender points of each of the characters, and the mid-line ML may be determined at the mid-point between the top-line TL and the lower-line LL.

The determined typography definitions are used by the ink management system 312 as the dimensional information for the local font size calculation. From the dimensional information including the top-, lower-, base- and mid-lines the ink management system 312 determines text size characteristics of the digital ink. For example, as shown in FIG. 8, the ink management system 312 determines a text height (or x-height) h as the vertical distance between the base-line BL and the mid-line ML of the digital ink 800 as a height-based digital ink (first) text size characteristic and a text bounding box 802 at the areal extent of the digital ink 800 (e.g., as defined vertically by the top-line TL and the lower-line LL and horizontally by the initial and last points of the digital ink 800) as an area-based digital ink (first) text size characteristic. These digital ink text size characteristics are used by the ink management system 312 to calculate the local font size for the typeset text in the present example. The text height and width defining the area may be initially measured in SI units, i.e., millimeters, and converted to typography units, e.g., points (pt), or measured in pt initially.

In particular, in the present example, two possible font sizes for the typeset ink are calculated, a height-based font size Sh based on the height-based digital ink text size characteristic and an area-based font size Sa based on the area-based digital ink text size characteristic. These typeset ink font sizes are then compared as part of a determination of which of the font sizes is the best for typesetting of the digital ink of the text block under consideration, thereby providing the local (first) font size for the typeset ink text.

Figure 9A:
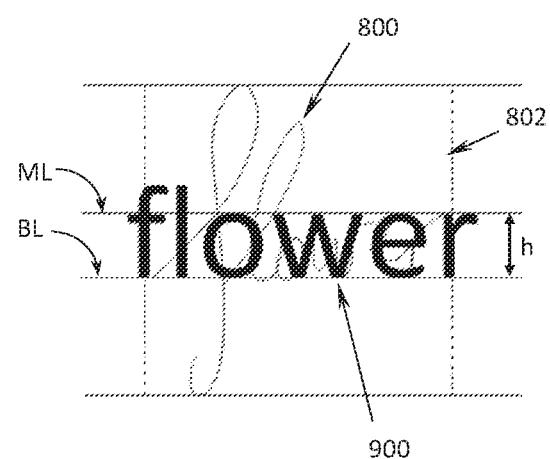
FIG. 9A illustrates the digital ink of FIG. 8 with example typeset ink thereover and the digital ink dimensional information.

The height-based font size Sh is determined so that the height of the non-ascender and non-descender parts of the typeset ink text is the same as the digital ink text height h. Accordingly, for the text height h of the digital ink 800, a height-based font size Sh of 72 pt results, for example. FIG. 9A shows the digital ink 800 of FIG. 8 with typeset ink 900 thereover (for illustration purposes) at the height-based font size of 72 pt. As can be seen, the typeset ink text 900 overflows the bounding box 802 of the digital ink 800. This may not be an issue for text of a text block that is alone, as in the example of FIG. 8. However, for text that is contained or otherwise linked to other objects, such as diagram or table elements, this overflow may result in the typesetted text overflowing the typeset ink shape enclosing the text, thereby dissatisfying the third criteria.

Figure 9B:
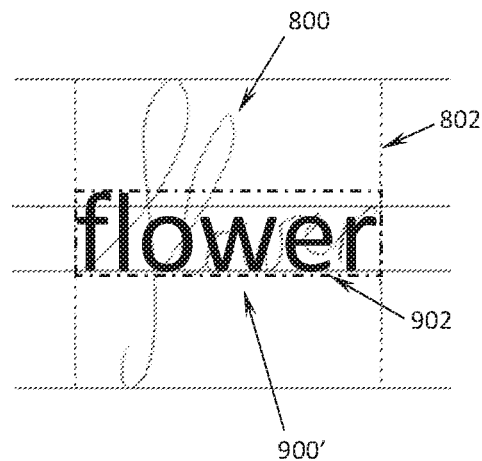
FIG. 9B illustrates the digital ink of FIG. 8 with example typeset ink thereover, the digital ink dimensional information and dimensional information of the typeset ink determined in accordance with an example of the present system and method.

The area-based font size Sa is determined so that the width of the typeset ink text has substantially the same width as the bounding box of the digital ink text. Accordingly, for the bounding box 802 of the digital ink 800, an area-based font size Sa of 62 pt results, for example. FIG. 9B shows the digital ink 800 of FIG. 8 with typeset ink 900' thereover (for illustration purposes) at the area-based font size of 62 pt. As can be seen, the typeset ink text 900' does not overflow the bounding box 802 of the digital ink 800. This is because, the area-based font size is based on the width of the digital ink text block bounding box, so that when typeset, the entire text line fits within the block, e.g., a bounding box 902 of the typeset ink text 900' has substantially the same width as the bounding box 802 of the digital ink text 800 as shown.

In the font size calculations described herein, it is understood that non-integer font size could be calculated. However, to achieve good integration with word processing applications and the like an integer font size may be provided, with rounding up or down of the digital ink text height and bounding box width (and other dimensional measurements) being used as appropriate.

Based on the calculated possible height- and area-based font sizes of the typeset ink text, the ink management system 312 of the present system and method is configured to select one of the calculated font sizes for the typesetting of the handwriting input. If the text block is alone, that is the text is isolated from shapes as in the example of FIG. 8, either of the calculated font sizes may be selected for the calculated local font size. However, in order to provide consistency across a diagram or other text and non-text content, the ink management system 312 may be configured to select one of the calculated font sizes based on pre-defined condition, such as the smallest possible font size or largest possible font size.

The Applicant has found that this mechanism of the present system and method for selecting the local font size for conversion of the digital ink to typeset ink based on the typography of the digital ink works particularly well for isolated text content, whether related or un-related to non-text content. However, for text content intended to be contained within a container, for example, it is possible that the typeset ink text content may overflow the typeset ink container after conversion when only the typography of the digital ink is considered.

Figure 10:
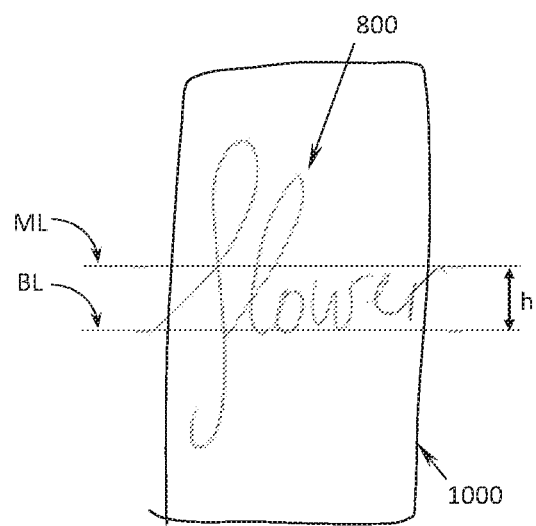
FIG. 10 shows example further handwritten input rendered as digital ink on the input interface of the computing device in relation to the digital ink of FIG. 8 depicting dimensional information of the digital ink determined in accordance with an example of the present system and method.

For example, FIG. 10 shows the input 800 of FIG. 8 with example handwritten input 1000 rendered as digital ink on the input interface 304 of the device 300, for example. The handwritten input 1000 is handwritten in a single continuous stroke, detected as non-text and recognized as a rectangle. Further, as the recognized text 800 is surrounded by the recognized shape 1000, the shape 1000 is detected as a container.

Figure 11A:
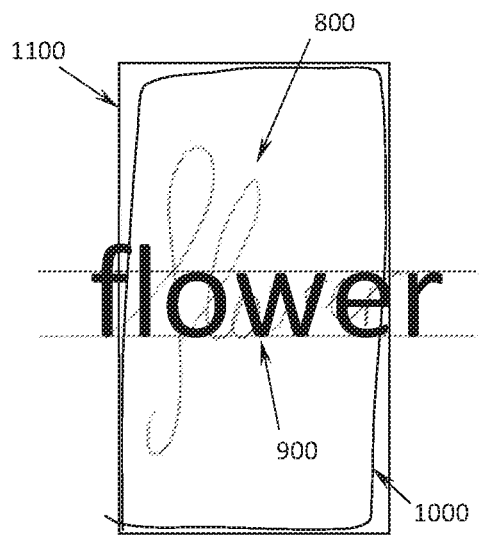
FIGS. 11A and 11B illustrates the digital ink of FIG. 10 with example typeset ink thereover and the digital ink dimensional information.

FIG. 11A shows the digital ink text 800 and digital ink shape 1000 of FIG. 10 with the typeset ink text 900 at the height-based font size Sh of 72 pt and typeset ink 1100 thereover (for illustration purposes). The typeset ink 1100 is a rectangle representing the digital ink rectangle 1000 upon typesetting. As can be seen, the typeset ink text 900 overflows the typeset ink shape 1100. The typesetting conversion of digital ink shapes in accordance with the present system and method may be performed in various ways based on various considerations, as discussed in detail later. In this example, the typesetting is performed so that the resultant typeset ink shape has dimensions which closely represent the dimensions of the digital ink shape, as can be seen in FIG. 11A.

Figure 11B:
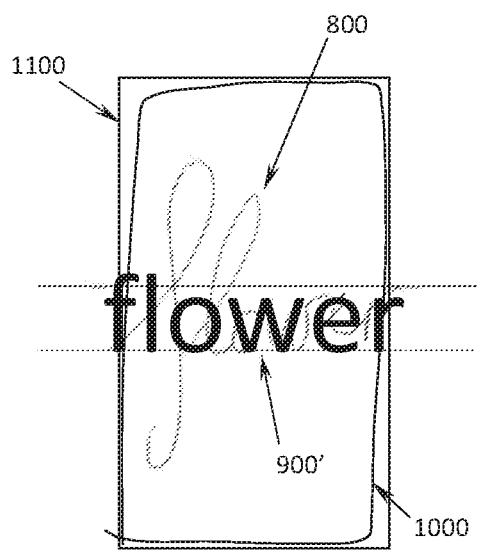

FIG. 11B shows the digital ink text 800 and digital ink shape 1000 of FIG. 10 with the typeset ink text 900' at the area-based font size Sa of 62 pt and the typeset ink 1100 thereover (for illustration purposes). As can be seen, the typeset ink text 900' also overflows the typeset ink shape 1100. Accordingly, the use of the typography of the text itself does not lead to a satisfactory result in this contained case, without some other definition for shape typeset conversion.

Accordingly, the typesetting operation may also be performed in light of a (third) criteria that the typeset ink text of each container (or cell) should be displayed in the container without overflowing that container, when contained text is present. As such, even if the handwritten text overflows the handwritten shape (partially) containing that text, if the recognition result detects the text as a label or content of a container, the resultant font size of the typeset ink text needs to be such that the typeset ink label or content does not overflow the typeset ink container.

As such the criteria may be further defined as:
(1) substantial differences in scale in handwritten text are respected,
(2) same font size is used for all text blocks that have been roughly handwritten with the same scale, and
(3) text of each container/cell is displayed without overflowing.

In order to ensure therefore that the typeset ink text is completely contained by the associated typeset ink container to satisfy the third criteria, the present system and method may perform the local font size calculation taking dimensional information of the recognized container into account. That is, as described earlier, dimensional information related to dimensions of the recognized shapes of the hand-drawn input are also used for this calculation. In particular, a tiered approach to font size selection may be taken with respect to the container dimensional information. That is, as a first tier or step, the height- and area-based font sizes Sh and Sa are calculated for a contained text block and it is tested whether one or both of these font sizes fit within the associated container. For example, the smallest font size of the height- and area-based font sizes Sh and Sa calculated for a text block may be selected so that overflow of the typeset ink text does not occur, thereby satisfying the third criteria.

Figure 12A:
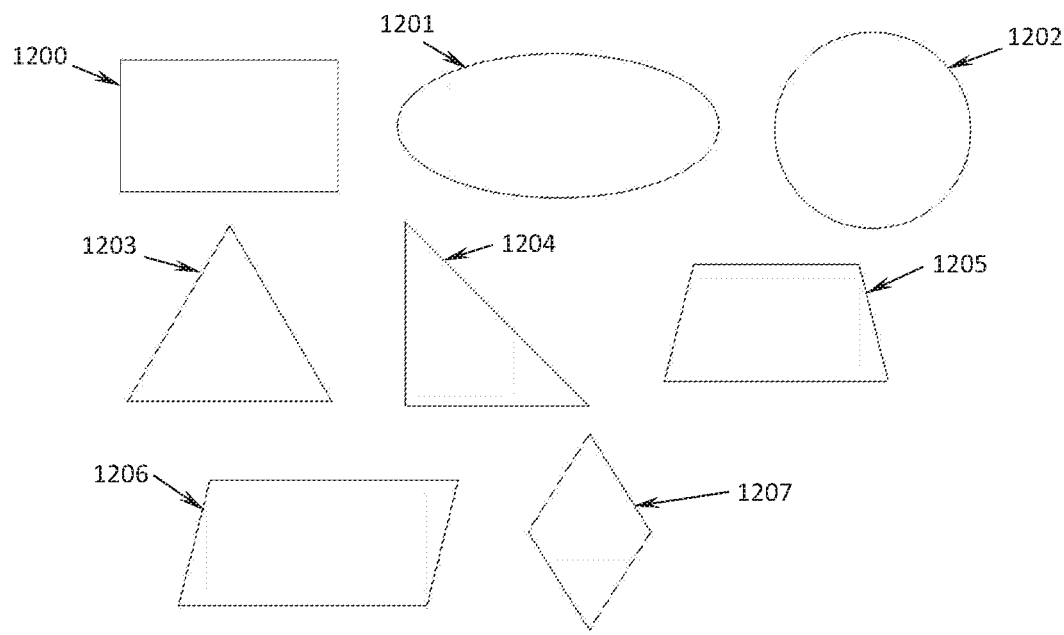
FIG. 12A illustrates a number of different shapes in typeset ink.

This test is performed in relation to dimensions of the recognized shapes, which includes several elements related to shape, including height, width and geometry. With respect to handwritten shapes the HWR system 314 determines the co-ordinate extrema of the shapes. These extrema define the geometry of the shape. For example, FIG. 12A shows a number of different shapes in typeset ink, namely a rectangle 1200, an oval 1201, a circle 1202, a (isosceles) triangle 1203, a right (angle) triangle 1204, a trapezoid 1205, a parallelogram (rhombus) 1206 and a diamond 1207. These typeset ink shapes are converted by the HWR system 314 from recognized handwritten shape input in the manner described earlier, and in this conversion the dimensions of the typeset ink shapes are determined.

The ink management system 312 uses these dimensions to determine text containment elements of each container as a container-based digital ink (second) text size characteristic. At the simplest level, the dimensions of the containers themselves can be defined as the text containment element. However, this may result in the typeset text being too close to the borders of the associated typeset container, which does not provide a pleasantly visual result. As such, the text containment elements are defined to be separated from the borders or extrema of the container by a certain margin, to define 'gutters', for example. In this way, the text containment elements are smaller in dimension (e.g., area) than the containers such that typeset ink text can be produced which is contained within the text containment element or fence and is therefore wholly contained within the containers themselves.

Figure 12B:
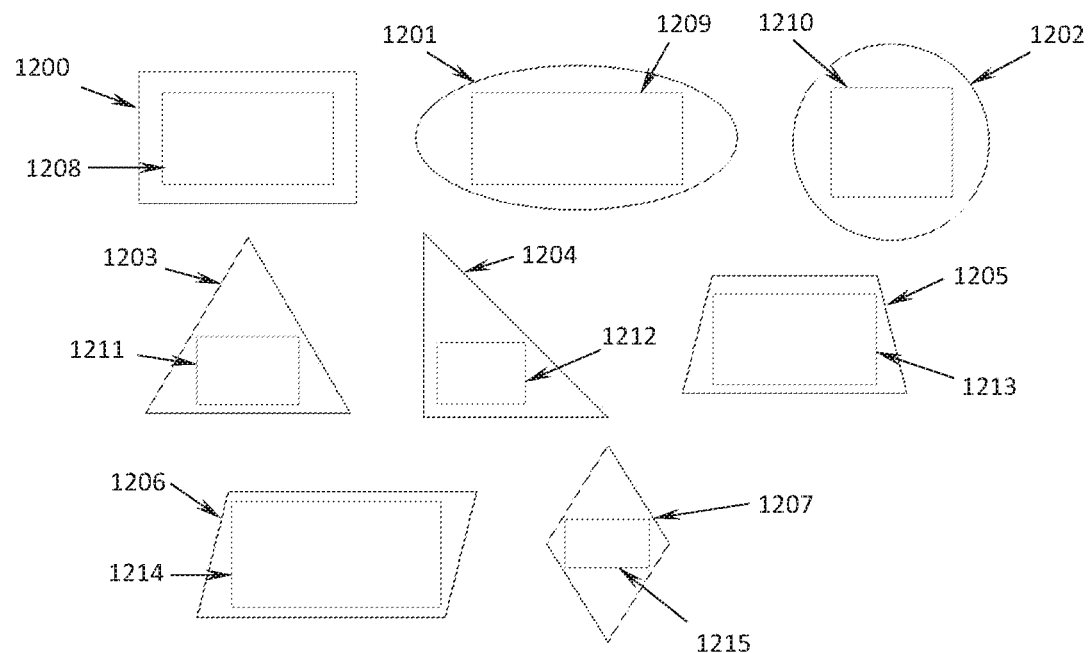
FIG. 12B illustrates the shapes of FIG. 12A with dimensional information of the typeset ink determined in accordance with an example of the present system and method.

The text fence may be determined as a simple pre-defined shape within any-shaped container by considering the height and width of the recognized container and its geometry. For example, FIG. 12B shows the shapes depicted in FIG. 12A with respective text fences defined as rectangles within the recognized containers. That is, the rectangle 1200 is defined with a rectangular text fence 1208, the oval 1201 is defined with a rectangular text fence 1209, the circle 1202 is defined with a rectangular text fence 1210, the triangle 1203 is defined with a rectangular text fence 1211, the right triangle 1204 is defined with a rectangular text fence 1212, the trapezoid 1205 is defined with a rectangular text fence 1213, the rhombus 1206 is defined with a rectangular text fence 1214 and the diamond 1207 is defined with a rectangular text fence 1215.

The dimensions of the enclosed rectangular text fence are determined based on the dimensions and geometry of the container so that the area of the rectangle is maximized while observing a minimum spacing or margin from the container sides. The sizing of this area and spacing may be settable, for example, via UI menus and the like.

Figure 12C:
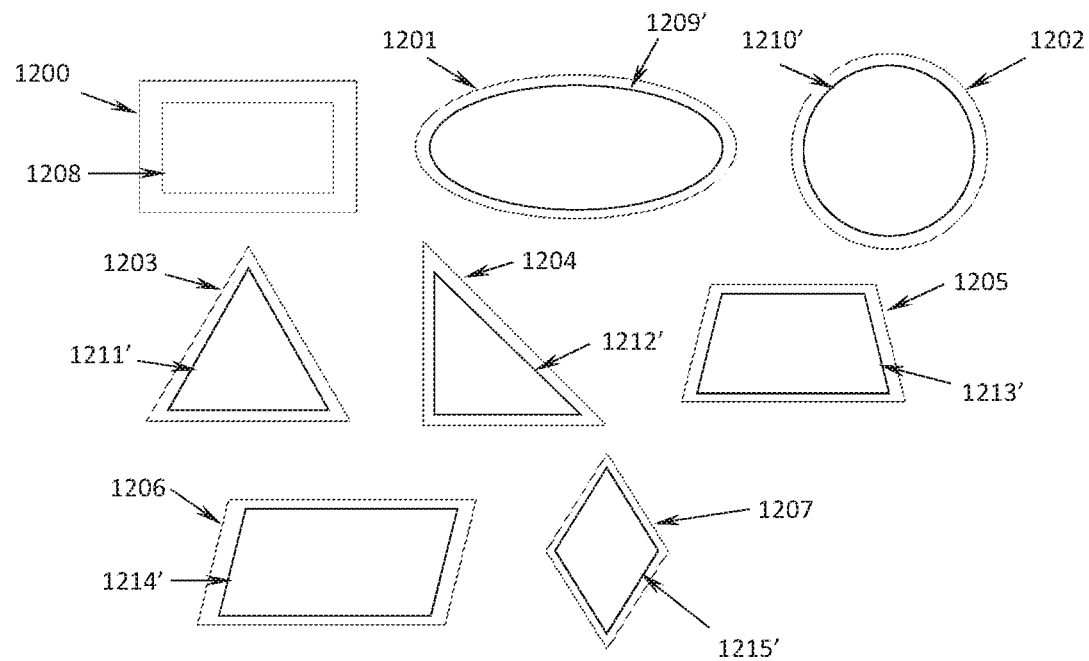
FIG. 12C illustrates the shapes of FIG. 12A with dimensional information of the typeset ink determined in accordance with an example of the present system and method.

Alternatively, or additionally, the text fence may be determined to correspond to the geometry of the recognized container by considering its geometry. For example, FIG. 12C shows the shapes depicted in FIG. 12A with respective text fences defined with the corresponding geometry within the recognized containers. That is, the rectangle 1200 is defined with the rectangular text fence 1208, the oval 1201 is defined with an oval text fence 1209', the circle 1202 is defined with a circular text fence 1210', the triangle 1203 is defined with a triangular text fence 1211', the right triangle 1204 is defined with a right triangular text fence 1212', the trapezoid 1205 is defined with a trapezoidal text fence 1213', the rhombus 1206 is defined with a rhomboidal text fence 1214' and the diamond 1207 is defined with a diamond text fence 1215'.

Similar to the pre-defined shaped fence, the dimensions of the enclosed geometrical text fence are determined based on the dimensions of the container so that the area of the geometrical shape is maximized while observing a minimum spacing or margin from the container sides. The sizing of this area and spacing may be settable, for example, via UI menus and the like.

Figure 13:
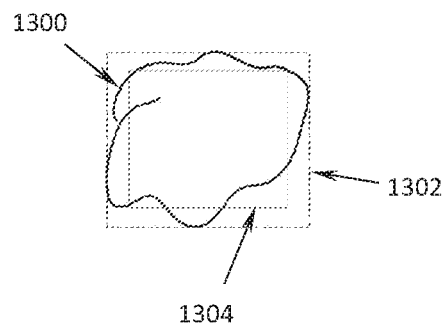
FIG. 13 illustrates an irregular shape in digital ink with dimensional information of typeset ink determined in accordance with an example of the present system and method.

The ink management system 312 may similarly determine text fences for irregular shapes. For example, FIG. 13 shows an irregular shape in digital ink 1300. The irregular shape 1300 is a cloud shape and therefore may not be converted into typeset ink by the HWR system 314 as it is recognized as irregular or out-of-lexicon, as described for example in afore-incorporated by reference U.S. patent application Ser. No. 14/955,155. However, the HWR system 314 is configured to determine the dimensions of the recognized irregular shape. Accordingly, the ink management system 312 may determine a regular shape corresponding to the irregular shape which has height and width defined by the irregular shape dimensions. For example, a rectangle 1302 is defined for the irregular shape 1300 in FIG. 13 defined by the height extremum and width extremum of the shape 1300. For this representative regular shape a text fence 1304 is defined as described earlier such that contained typeset ink text may be contained within the irregular digital (or typeset) ink shape. Alternatively, the present system and method may typeset such irregular shapes through the recognition process and as such associated text fences may be determined.

Figure 11C:
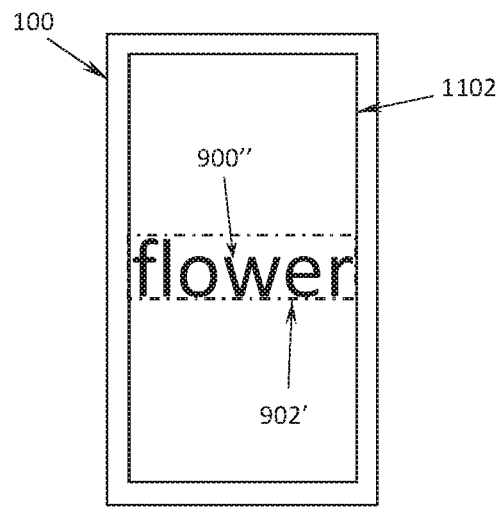
FIG. 11C illustrates example typeset ink as typeset from the digital ink of FIG. 10 with dimensional information of the typeset ink determined in accordance with an example of the present system and method.

Returning to the example of FIG. 11, FIG. 11C shows the typeset ink container 1100 with a text fence 1102 determined by the ink management system 312. In this example, as the text fence 1102 is smaller again than the container 1100, both the height-based font size Sh as depicted in FIG. 11A and the area-based font size Sa as depicted in FIG. 11B are too large with respect to the text fence 1102. Thus, as a next tier or step, the ink management system 312 calculates another possible font size for the typeset ink, a container-based font size Sc based on a characteristic of the text fence size.

The container-based font size Sc is determined so that the width of the typeset ink text has substantially the same width as the text fence of the typeset ink container. Accordingly, for the text fence 1102, a container-based font size Sc of 50 pt results, for example, such that FIG. 11C shows typeset ink text 900" at the container-based font size of 50 pt. As can be seen, the typeset ink text 900" does not overflow the typeset ink container 1100. This is because, the container-based font size is based on the width of the relatively smaller text fence of the container (e.g., a bounding box 902' of the typeset ink text 900" has substantially the same width as the text fence 1102 of the typeset ink container 1100 as shown), so that when typeset, the entire text line fits within the block. As such, the container-based font size is calculated as a local font size which is scaled to the container (or margins thereof) itself. Accordingly, for the digital ink 800 in this example of FIG. 10, the local font size is calculated as 50 pt.

It is possible to configure the ink management system 312 to calculate and adopt the container-scaled or -based font size in any contained text case in order to satisfy the third criteria without taking the tiered approach, thereby ignoring or not calculating the typography-based font sizes. There are some contained text cases where this may be successfully applied, however in other cases the result may be undesirable.

Figure 14:
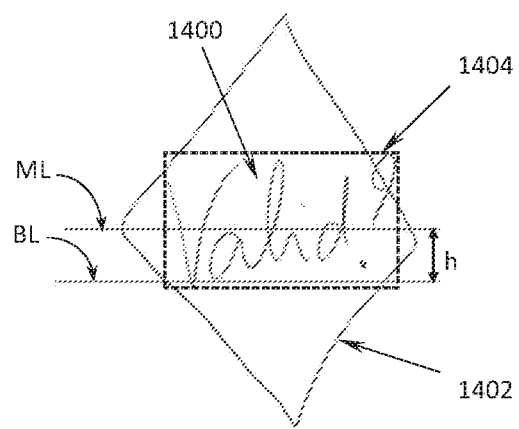
FIG. 14 shows example handwritten input rendered as digital ink on the input interface of the computing device depicting dimensional information of the digital ink determined in accordance with an example of the present system and method.

For example, FIGS. 14 and 15 show an example with respect to the ink management system 312 calculating the three possible local font size types. FIG. 14 shows example handwritten input 1400 and 1402 rendered as digital ink on the input interface 304 of the device 300, for example. The handwritten input 1400 is handwritten in multiple strokes, detected as text and recognized as the word and grammatical (e.g., question) mark "Valid?" written in one line of text. As can be seen, the handwriting input 1400 includes a capitalized character, i.e., the "V", characters having an ascender, i.e., the "l", "d" and "?", characters having a delayed stroke, i.e., the "i" and "?", and a character having neither ascenders nor descenders, e.g., the "a". The handwritten input 1402 is handwritten in a single continuous stroke, detected as non-text and recognized as a diamond. Further, as the recognized text 1400 is surrounded by the recognized shape 1402, the shape 1402 is detected as a container.

For the example digital ink text 1400, the top-line TL (not shown) may be determined at the upper extent of the ascender of the character "?", the lower-line LL (not shown) and the base-line BL (shown) may be determined at the average of the lowest non-descender points of each of the characters, and the mid-line ML (shown) may be determined at the mid-point between the top-line TL and the base-line BL. Further, as shown, the text height h is defined as the vertical distance between the base-line BL and the mid-line ML of the digital ink text 1400 and a text bounding box 1404 is defined at the areal extent of the digital ink text 1400.

Figure 15A:
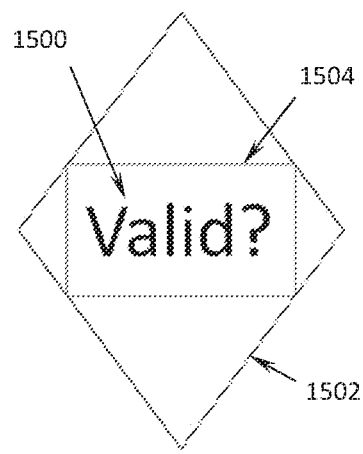
FIG. 15A illustrates example typeset ink as typeset from the digital ink of FIG. 14 with dimensional information of the typeset ink and text of the input typeset at a height-based font size determined in accordance with an example of the present system and method.
Figure 15B:
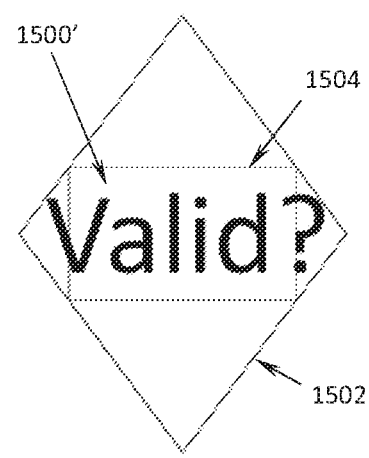
FIG. 15B illustrates example typeset ink as typeset from the digital ink of FIG. 14 with the typeset ink dimensional information and the text of the input typeset at an area-based font size determined in accordance with an example of the present system and method.

As before, the height-based font size Sh is determined so that the height of the non-ascender and non-descender parts of the typeset ink text is substantially the same as the text height h of the digital ink text 1400, and the area-based font size Sa is determined so that the width of (the bounding box of) the typeset ink text has substantially the same width as the bounding box 1404 of the digital ink text 1400. FIG. 15A shows typeset ink text 1500 corresponding to the digital ink text 1400 at the height-based font size Sh and a typeset ink container 1502 corresponding to the digital ink container 1402. FIG. 15B shows typeset ink text 1500' corresponding to the digital ink text 1400 at the area-based font size Sa and the typeset ink container 1502.

FIGS. 15A and 15B further show a text fence 1504 as determined by the ink management system 312 based on the typeset ink container 1502. As can be seen, the typeset ink text 1500 at the height-based font size Sh is contained within the text fence 1504 however the typeset ink text 1500' at the area-based font size Sa overflows the text fence 1504.

With the earlier described first step of the tiered approach, the ink management system 312 would at this point select the height-based font size Sh, as it satisfies the third criteria. However, based on the raw ink input 1400, it can be seen that the typeset text 1500 at the height-based font size Sh presents a smaller block of text with respect to the typeset container 1502 than the digital ink text 1400 with respect to the digital ink container 1402. This result is understandable as the typography-based font sizes are calculated without regard to the dimensional information of the containing or associated shape.

Figure 15C:
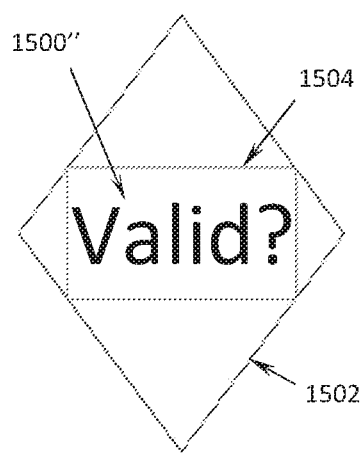
FIG. 15C illustrates example typeset ink as typeset from the digital ink of FIG. 14 with the typeset ink dimensional information and the text of the input typeset at a container-based font size determined in accordance with an example of the present system and method.

On the other hand, the container-based font size Sc is determined with respect to the dimensional information of the container, so that the width of (the bounding box of) the typeset ink text has substantially the same width as the text fence 1504 of the typeset ink container 1502. FIG. 15C shows typeset ink text 1500" corresponding to the digital ink text 1400 at the container-based font size Sc and the typeset ink container 1502 with the text fence 1504. As can be seen, the typeset ink text 1500" at the container-based font size Sc is contained within the text fence 1504 like the typeset ink text 1500 at the height-based font size Sh, but the container-based font size is slightly larger than the height-based font size, and as such more closely resembles the relationship of the digital ink elements.

As such, if the ink management system 312 is configured to calculate and adopt the container-based font size as a default in order to ensure containment of the typeset text, it is possible that the typeset result provides close adherence with the raw ink input. However, such a simple mechanism may not provide satisfactory results based on the size of the container, and therefore the text fence.

Figure 16:
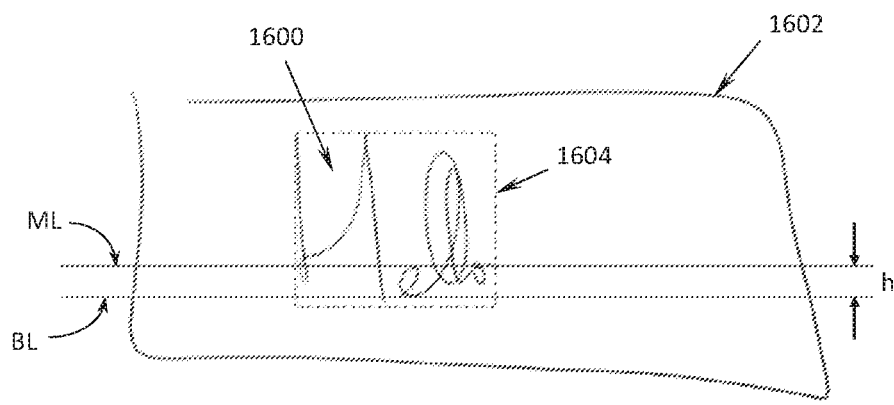
FIG. 16 shows example handwritten input rendered as digital ink on the input interface of the computing device depicting dimensional information of the digital ink determined in accordance with an example of the present system and method.

For example, FIG. 16 shows example handwritten input 1600 and 1602 rendered as digital ink on the input interface 304 of the device 300, for example. The handwritten input 1600 is handwritten in multiple strokes, detected as text and recognized as the word "Hello" written in one line of text. As can be seen, the handwriting input 1600 includes a capitalized character, i.e., the "H", characters having an ascender, e.g., the "l", and characters having neither ascenders nor descenders, i.e., the "e" and "o". The handwritten input 1602 is handwritten in a single continuous stroke, detected as non-text and recognized as a rectangle. Further, as the recognized text 1600 is surrounded by the recognized shape 1602, the shape 1602 is detected as a container.

For the example digital ink text 1600, the top-line TL (not shown) may be determined at the upper extent of the ascender of the letter "H", the lower-line LL (not shown) and the base-line BL (shown) may be determined at the average of the lowest non-descender points of each of the characters, and the mid-line ML (shown) may be determined at the mid-point between the top-line TL and the base-line BL. Further, as shown, the text height h is defined as the vertical distance between the base-line BL and the mid-line ML of the digital ink text 1600 and a text bounding box 1604 is defined at the areal extent of the digital ink text 1600.

Figure 17A:
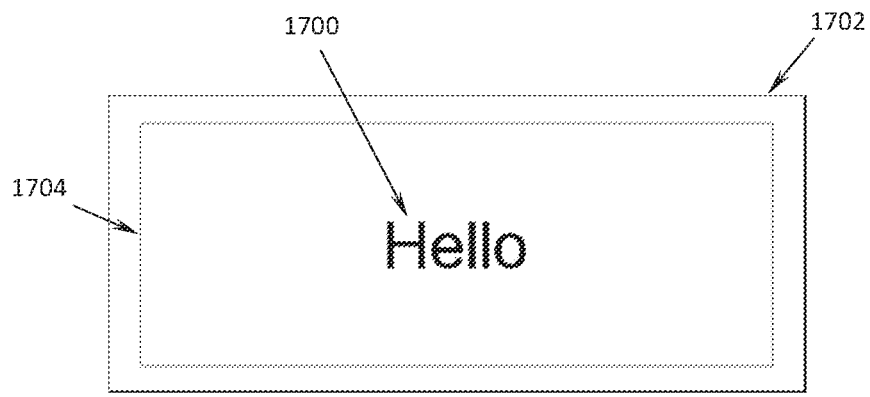
FIG. 17A illustrates example typeset ink as typeset from the digital ink of FIG. 16 with dimensional information of the typeset ink and text of the input typeset at a height-based font size determined in accordance with an example of the present system and method.
Figure 17B:
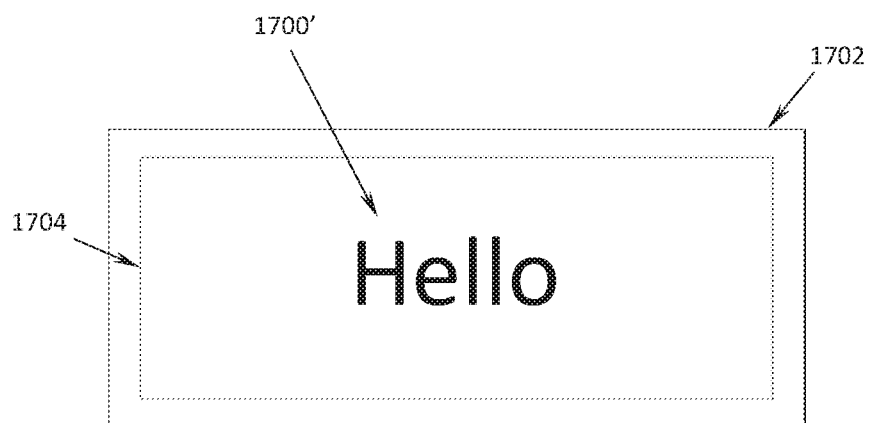
FIG. 17B illustrates example typeset ink as typeset from the digital ink of FIG. 16 with the typeset ink dimensional information and the text of the input typeset at an area-based font size determined in accordance with an example of the present system and method.

As before, the height-based font size Sh is determined so that the height of the non-ascender and non-descender parts of the typeset ink text is substantially the same as the text height h of the digital ink text 1600, and the area-based font size Sa is determined so that the width of (the bounding box of) the typeset ink text has substantially the same width as the bounding box 1604 of the digital ink text 1600. FIG. 17A shows typeset ink text 1700 corresponding to the digital ink text 1600 at the height-based font size Sh and a typeset ink container 1702 corresponding to the digital ink container 1702. FIG. 17B shows typeset ink text 1700' corresponding to the digital ink text 1600 at the area-based font size Sa and the typeset ink container 1702.

FIGS. 17A and 17B further show a text fence 1704 as determined by the ink management system 312 based on the typeset ink container 1702. As can be seen, both the typeset ink text 1700 at the height-based font size Sh and the typeset ink text 1700' at the area-based font size Sa are contained within the text fence 1704.

Figure 17C:
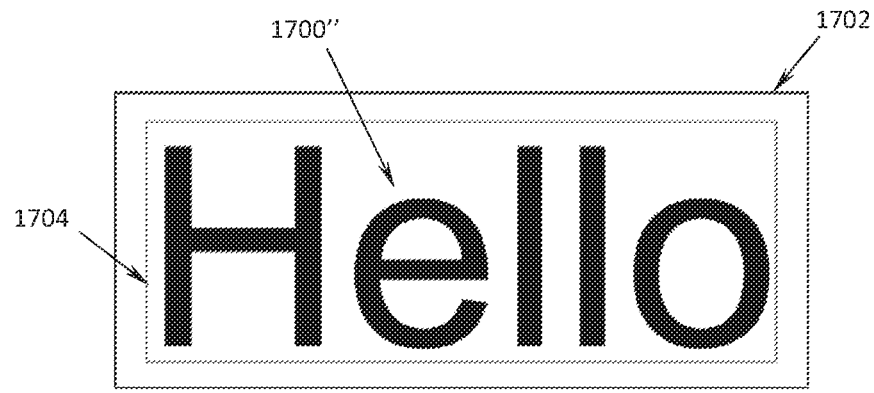
FIG. 17C illustrates example typeset ink as typeset from the digital ink of FIG. 16 with the typeset ink dimensional information and the text of the input typeset at a container-based font size determined in accordance with an example of the present system and method.

FIG. 17C shows typeset ink text 1700" corresponding to the digital ink text 1600 at the container-based font size Sc and the typeset ink container 1702 with the text fence 1704. The container-based font size Sc is determined as before so that the width of (the bounding box of) the typeset ink text has substantially the same width as the text fence 1704 of the typeset ink container 1702. As can be seen, the typeset ink text 1700" at the container-based font size Sc is contained within the text fence 1704 like the typeset ink text 1700 at the height-based font size Sh and the typeset ink text 1700' at the area-based font size Sa. However, due to the dimensions of the container 1702 and the distance settings for the text fence definition, the container-based font size Sc is relatively large such that the relatively large typeset ink text 1700" fills the container 1702.

Based on the handwritten input 1600 and 1602 as shown in FIG. 16, such a typeset result clearly was not the intention of the user, and the typeset ink text 1700 at the height-based font size Sh is clearly closer to that intention. Accordingly, in the present single text line examples, configuring the ink management system 312 to, as an initial step, calculate and compare the smallest font size of the height- and area-based font sizes Sh and Sa to the text containment element, and then, if the single text line at the smallest font size overflows the text containment element, as a subsequent step calculate the container-based font size Sc, provides a good typeset result that respects the handwritten input while satisfying the third criteria.

In these examples, both the height- and area-based font sizes are calculated. However, it is possible that only one of these is calculated. For example, the ink management system 312 may be configured to not determine the area-based font size Sa so that only the height- and container-based font sizes Sh and Sc are calculated, if necessary. Alternatively, the ink management system 312 may be configured to not determine the height-based font size Sh so that only the area- and container-based font sizes Sa and Sc are calculated. Alternatively, all of the font sizes Sh, Sa and Sc are calculated.

Figure 18:
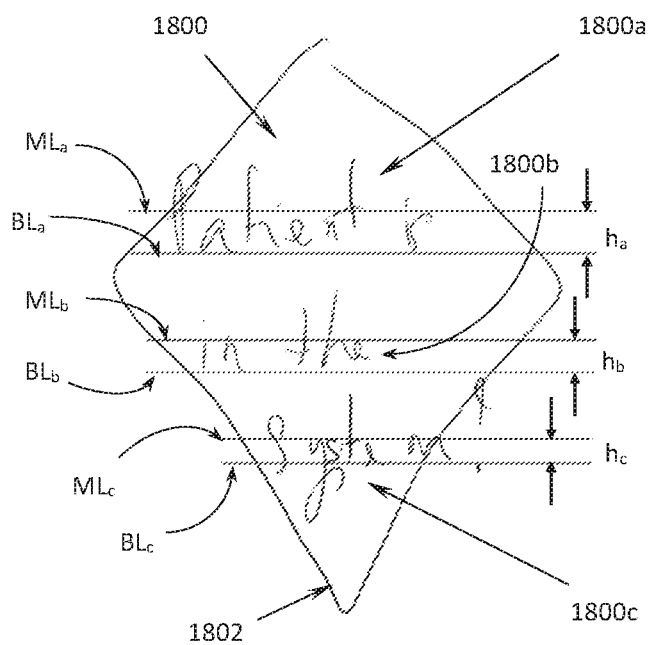
FIG. 18 shows example handwritten input rendered as digital ink on the input interface of the computing device depicting dimensional information of the digital ink determined in accordance with an example of the present system and method.

Adherence to the smallest font size may cause other issues in the typeset result however, particularly with respect to multiple text line examples. In such cases, further typesetting mechanisms may be used as is now described in relation to FIGS. 18 and 19. FIG. 18 shows example handwritten input 1800 and 1802 rendered as digital ink on the input interface 304 of the device 300, for example. The handwritten input 1800 is handwritten in multiple strokes, detected as text and recognized as the words and grammatical mark "Patient is in the system?" written in multiple lines of text 1800a, 1800b and 1800c. The first text line 1800a includes the words "Patient is", the second text line 1800b includes the words "in the" and the second text line 1800*c* includes the words and grammatical mark "the system?". The handwritten input 1802 is handwritten in a single continuous stroke, detected as non-text and recognized as a diamond. Further, as the recognized text 1800 is surrounded by the recognized shape 1802, the shape 1802 is detected as a container.

As can be seen, the first text line 1800*a* includes a capitalized character, i.e., the "P", characters having an ascender, e.g., the "t", characters having a delayed stroke, e.g., the "i" and "t", and characters having neither ascenders nor descenders, i.e., the "a", "e", "n" and "s", the second text line 1800*b* includes characters having an ascender, i.e., the "t" and "h", characters having a delayed stroke, i.e., the "i" and "t", and characters having neither ascenders nor descenders, i.e., the "n" and "e", and the third text line 1800*c* includes characters having an ascender, i.e., the "t" and "?", a character having a descender, i.e., the "y", characters having a delayed stroke, i.e., the "t" and "?", and characters having neither ascenders nor descenders, i.e., the "s" and "e".

In handling multiple digital ink text lines, the present system and method determines the corresponding dimensional information for each text line in the local font size calculation. Further, as the dimensional information is determined at character-level, the presence of multiple words in some of the text lines does not present a difficulty. However, it is understood that the dimensional information could be determined at word-level (or sentence-, line-, paragraph- or block-levels) so that any comparative values, such as averages and means, are determined between words.

For the example (first) digital ink text line 1800*a*, the (first) top-line $TL_a$ (not shown) may be determined at the upper extent of the ascender of the second letter "t", the (first) lower-line $LL_a$ (not shown) and the (first) base-line $BL_a$ (shown) may be determined at the average of the lowest non-descender points of each of the characters, and the (first) mid-line $ML_a$ (shown) may be determined at the mid-point between the first top-line $TL_a$ and the first base-line $BL_a$. Further, as shown, the (first) text height $h_a$ is defined as the vertical distance between the first base-line $BL_a$ and the first mid-line $ML_a$ of the first digital ink text line 1800*a*.

For the example (second) digital ink text line 1800*b*, the (second) top-line $TL_b$ (not shown) may be determined at the upper extent of the ascender of the letter "h", the (second) lower-line $LL_b$ (not shown) and the (second) base-line $BL_b$ (shown) may be determined at the average of the lowest non-descender points of each of the characters, and the (second) mid-line $ML_b$ (shown) may be determined at the mid-point between the second top-line $TL_b$ and the second base-line $BL_b$. Further, as shown, the (second) text height $h_b$ is defined as the vertical distance between the second base-line $BL_b$ and the second mid-line $ML_b$ of the second digital ink text line 1800*b*.

For the example (third) digital ink text line 1800*c*, the (third) top-line $TL_c$ (not shown) may be determined at the upper extent of the ascender of the character "?", the (third) lower-line $LL_c$ (not shown) may be determined at the lower extent of the descender of the letter "y", the (third) base-line $BL_c$ (shown) may be determined at the average of the lowest non-descender points of each of the characters, and the (third) mid-line $ML_c$ (shown) may be determined at the mid-point between the third top-line $TL_c$ and the third base-line $BL_c$. Further, as shown, the (third) text height $h_c$ is defined as the vertical distance between the third base-line $BL_c$ and the third lower-line $LL_c$ of the third digital ink text line 1800*c*.

Figure 19A:
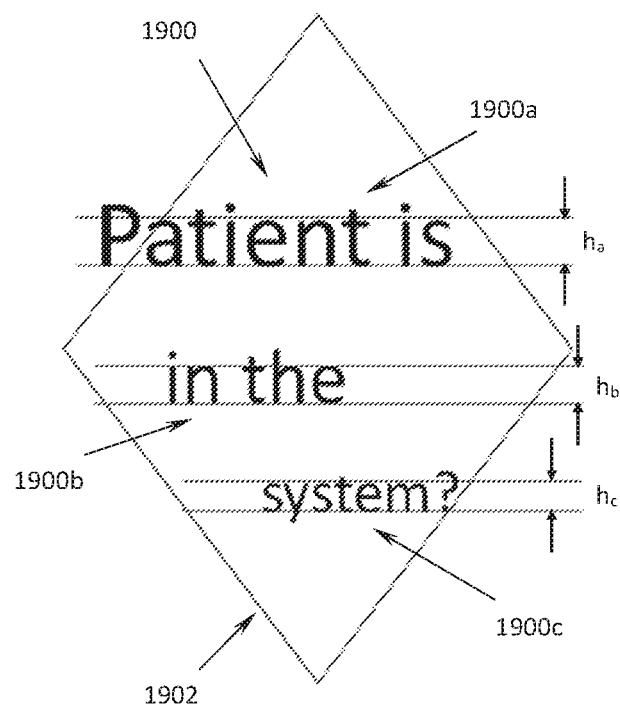
FIG. 19A illustrates example typeset ink as typeset from the digital ink of FIG. 18 with the digital ink dimensional information and multi-line text of the input typeset at height-based font sizes determined in accordance with an example of the present system and method.

The ink management system 312 may be configured to respect the individual text lines of the handwritten input when converting to typeset, such that from the individually determined digital ink text heights $h_a$, $h_b$ and $h_c$ respective height-based font sizes $Sh_a$, $Sh_b$ and $Sh_c$ are determined by the ink management system 312 in the earlier described manner for individual text lines. FIG. 19A shows typeset ink text 1900 corresponding to the digital ink text 1800 with a first typeset ink text line 1900*a* corresponding to the first digital ink text line 1800*a* at the height-based font size $Sh_a$, a second typeset ink text line 1900*b* corresponding to the second digital ink text line 1800*b* at the height-based font size $Sh_b$, and a third typeset ink text line 1900*c* corresponding to the third digital ink text line 1800*c* at the height-based font size $Sh_c$.

In FIG. 19A the spacing between the handwritten text lines 1800*a*, 1800*b* and 1800*c* is substantially preserved in the typeset ink text lines 1900*a*, 1900*b* and 900*c*, however a normalized spacing or other spacing calculated based the digital ink spacing may be used. Further, a typeset ink container 1902 corresponding to the digital ink container 1802 is shown in FIG. 19A.

As can be seen, based on the different digital ink text heights $h_a$, $h_b$ and $h_c$ the height-based font sizes $Sh_a$, $Sh_b$ and $Sh_c$ are different from one another. This result is clearly not reflective of the intention of the user based on the handwritten input 1800. In order to provide a single font size for a text block, whether that text block is related or not-related to non-text, such as a container, the ink management system 312 is configured to take the smallest height-based font size for that text block for the comparison with the area-based font size (if calculated). Accordingly, in the example of FIG. 19A, the ink management system 312 takes the height-based font size $Sh_c$ of the third typeset ink text line 1900*c*. Alternatively, the largest value or an average or median value could be used, in consideration of the third criteria.

Figure 19B:
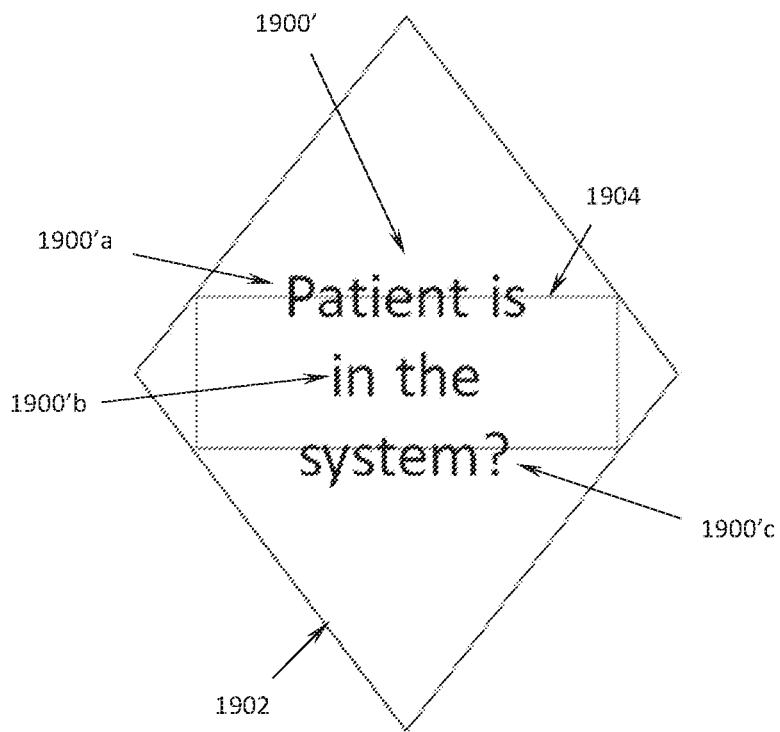
FIG. 19B illustrates example typeset ink as typeset from the digital ink of FIG. 18 with the typeset ink dimensional information and the multi-line text of the input typeset at one of the height-based font sizes of FIG. 19A.

Based on the tiered approach, the selected typography-based font size is compared to the text containment element of the recognized container. FIG. 19B shows a text fence 1904 as determined by the ink management system 312 based on the typeset ink container 1902. FIG. 19B further shows typeset ink text 1900' corresponding to the digital ink text 1800 with typeset ink text lines 1900'*a*, 1900'*b* and 1900'*c* respectively corresponding to the digital ink text lines 1800*a*, 1800*b* and 1800*c* each at the selected (third) height-based font size $Sh_c$. The multi-line typeset ink text 1900' has an inter-line spacing which is a normalized value, e.g., a pre-defined value or calculated as a percentage of the selected height-based font size. As can be seen, the typeset ink text 1900' block overflows the text fence 1904 of the container 1902.

As such, based on the afore-described tiered approach, the present system and method would then calculate the container dimension scaled font size as a next step. However, since in the present example multiple lines of text are contained, rather than the container-based font size Sc being determined by providing the width of (the bounding box of) the typeset ink text at substantially the same width as the text fence, the ink management system 312 is configured to determine the container-based font size Sc so that the height of the typeset ink text over the multiple text lines (e.g., the height of the typeset ink text block) is substantially equal to the text fence of the typeset ink container.

Figure 19C:
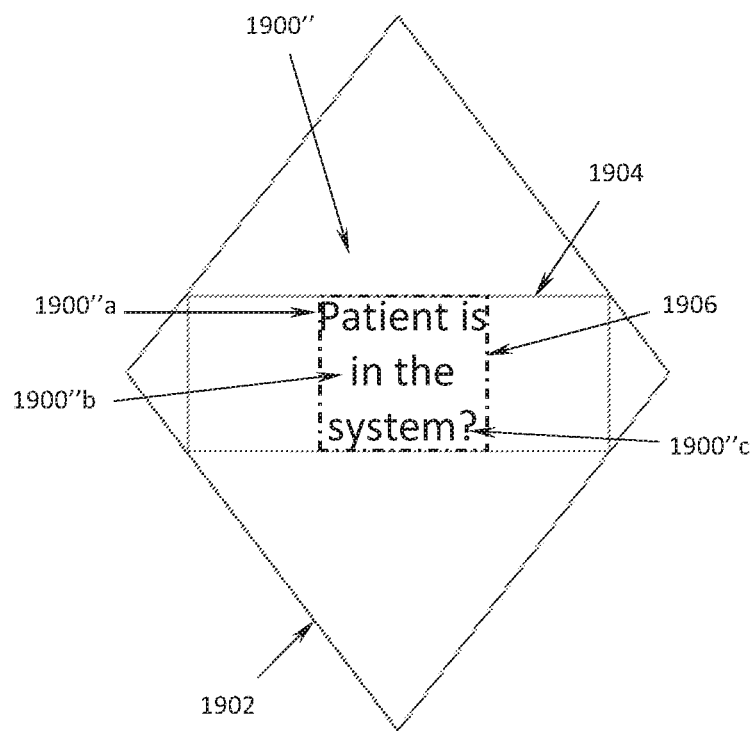
FIG. 19C illustrates example typeset ink as typeset from the digital ink of FIG. 18 with dimensional information of the typeset ink and the multi-line text of the input typeset at a container-based font size determined in accordance with an example of the present system and method.

As before, the ink management system 312 may be configured to respect the individual text lines of the handwritten input when converting to typeset. FIG. 19C shows typeset ink text 1900" corresponding to the digital ink text 1800 with a first typeset ink text line 1900″a corresponding to the first digital ink text line 1800a at the container-based font size Sc, a second typeset ink text line 1900″b corresponding to the second digital ink text line 1800b at the container-based font size Sc, and a third typeset ink text line 1900″c corresponding to the third digital ink text line 1800c at the container-based font size Sc. As can be seen, the container-based font size is based on the height of the relatively smaller text fence of the container (e.g., a bounding box 1906 of the typeset ink text 1900″ has substantially the same height as the text fence 1904 of the typeset ink container 1902 as shown) with an inter-line spacing which is a normalized value, e.g., a pre-defined value or calculated as a percentage of the container-based font size. As such, when typeset, the entire text block including the multiple text lines fits within the text fence 1904.

As such, the container-based font size is calculated in the present system and method based on the dimensions of the contained text fence of the container. Namely, the container-based font size is calculated based on the width or the height of the text fence. Alternatively, or additionally, both the width and height (i.e., the area) of the text fence may be considered in the calculation of the container-based font size.

In the present example however, due to the dimensions of the container 1902 and the distance settings for the text fence definition, the container-based font size Sc is relatively small such that the typeset ink text 1900′ is relatively small compared to the container 1902. Based on the handwritten input 1800 and 1802 as shown in FIG. 18, such a typeset result clearly was not the intention of the user, and as can be seen from FIG. 19B, the selected height-based font size $Sh_c$ provides closer adherence to user intent.

This undesired result may be rectified by configuring the ink management system 312 to utilize a text fence of different dimensions or shape, e.g., as discussed earlier, or by not respecting the text lines in the handwritten input when converting to typeset, e.g., by reflowing of the typeset ink text so that recognized words are moved between the text lines with accompanying inter-word spaces).

For example, the present system and method may perform another or different step within the tiered approach when multiple text lines are present. That is, after the initial step of calculating the typography-based font sizes and comparison with the text containment element, if present, the ink management system 312 is configured to determine in a subsequent step and based on the recognition result of the HWR system 314, for example, whether multiple lines of text are present, if the comparison yields the result that the typeset text would overflow the text containment element. If it is determined that multiple lines are not present, as would result for the examples of FIGS. 14 and 16 for example, the next step of calculating the container-scaled font size is performed. If it is determined that multiple lines are present, the subsequent step proceeds to determine whether the multiple lines can be reflowed at the calculated typography-based font size so that overflow does not occur. If overflow still occurs, then the next step is performed.

Figure 19D:
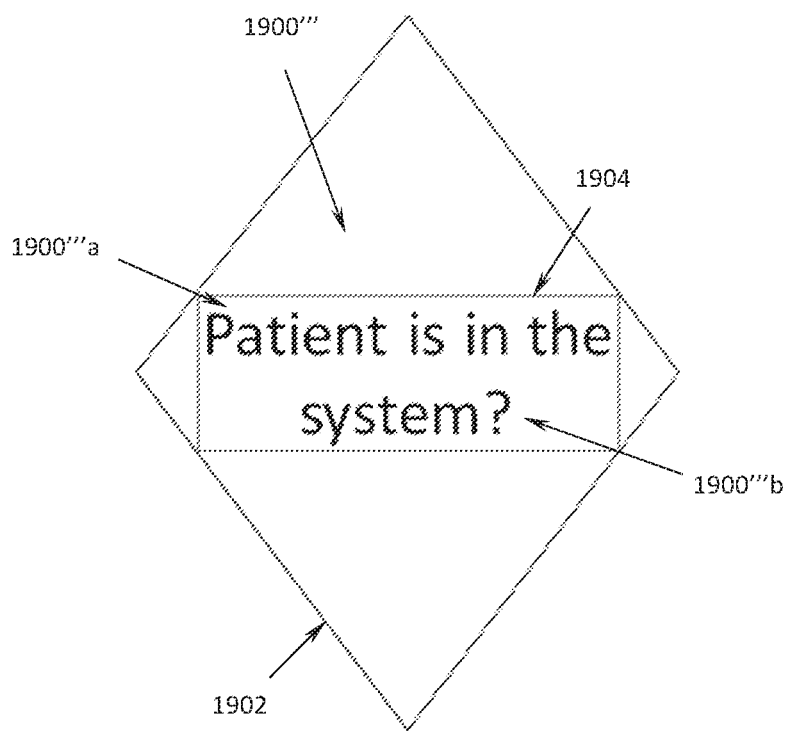
FIG. 19D illustrates example typeset ink as typeset from the digital ink of FIG. 18 with the typeset ink dimensional information and the multi-line text of the input typeset at an area-based, container-based font size determined in accordance with an example of the present system and method.

FIG. 19D shows the typeset ink text 1900′ at the height-based font size $Sh_c$ with reflow of the recognized words of the typeset ink text allowed and with an inter-line spacing which is a normalized value, e.g., a pre-defined value or calculated as a percentage of the container-based font size. Thus, as shown in FIG. 19D, the typeset ink text 1900′ has a first typeset ink text line 1900′″a corresponding to the merged content of the first and second digital ink text lines 1800a and 1800b at the height-based font size $Sh_c$, and a second typeset ink text line 1900′″b (as in FIG. 19B) corresponding to the third digital ink text line 1800c at the height-based font size $Sh_c$. That is, the words "in the" from the second digital ink text line 1800b are merged after the words "Patient is" of the first digital ink text line 1800a such that the first typeset ink text line 1900′″a includes the words "Patient is in the".

Reflow is performed based on the dimensions of the text fence and the calculated smallest height-based (or area-based) font size for the text lines. That is, the ink management system 312 determines based on the recognized words of the text lines 1800a and 1800b whether reflow can take place, e.g., at word boundaries as identified by the HWR system 314, with or without reflow rules, such as hyphenation, orphaning, and reflows the (words of the) text lines so that each line of text fits within the text fence at the smallest typography-based font size.

In this example, the reflowed typeset text at the smallest height-based font size $Sh_c$ does not overflow the text containment element 1904, such that the third criteria is met. Therefore, the height-based font size is selected by the ink management system 312 as the local font size, without the need to calculate the container-scaled font size. As such, when typeset, the entire text block including the multiple text lines fits within the text fence 1904 while providing a local font size which is closer to the size of the handwritten input.

In the examples described so far involving contained text, the typeset ink text is centered in the typeset ink container, e.g., as in FIG. 11C, FIG. 15, FIG. 17, and FIGS. 19B-19D. The ink management system 312 may be configured to center the typesetted text when the contained text is detected as a label of a text cell, for example. That is, the relationship of the text and container as recognized by the HWR system 314 may be interpreted as a text cell or as one or more text blocks within a container. As described in afore-incorporated by reference U.S. patent application Ser. No. 14/955,155, containers may be defined as being a shape that contains text and/or non-text content. That is, a container may contain one or more text blocks, one or more shapes (which in turn may be containers or cells), or a combination thereof. On the other hand, cells may be defined as containers that only contain text content in one or more text blocks, and text within the cell may be treated as a label of the cell.

In the present system and method the typeset ink text is centered both horizontally and vertically with respect to the text fence of the typeset ink container which is detected as a text cell. In this way, the text fence may be treated as the bounding box of the text label within the cell, and as such multiple text lines with normalized inter-line spacing and paragraphing can be supported together with text reflow or wrapping within that text 'box', such as in the example of FIG. 19D. This also allows resizing of the cell, and therefore the text box, to be performed without resizing of the font size of the text label, which may be desired when the selected typeset ink font size results in the typeset ink text overflowing the cell or the user reduces the size of the cell through selection, such that the typeset ink text may be reflowed accordingly.

For example, the ink management system 312 may be configured to allow a minimum or normal typeset ink font size (for purposes of legibility) which acts as a font size threshold (that is if the local font size is calculated as below the minimum font size, the minimum or normal size is used not the local font size). In such cases the resulting typeset ink text may overflow the text fence or the typeset ink cell itself.

Figure 20A:
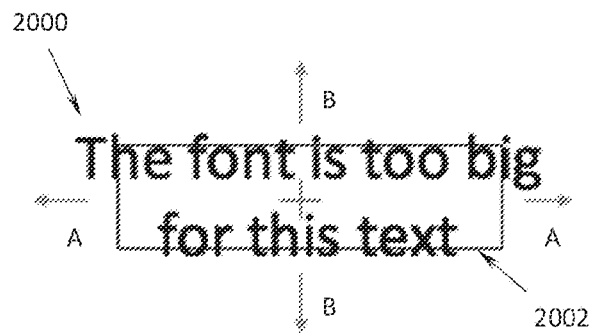
FIG. 20A shows example typeset ink content rendered as a typeset ink cell with contained text on the input interface of the computing device depicting resizing directions.
Figure 20B:
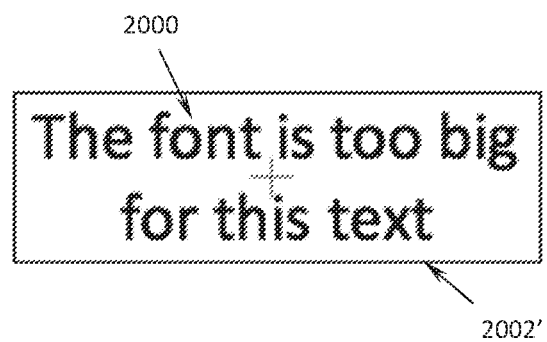
FIG. 20B shows the typeset ink cell of FIG. 20A resized in accordance with an example of the present system and method.

This is illustrated in FIG. 20A, in which a typeset ink label 2000 is centered in a typeset ink cell 2002 (the center is illustrated by the cross). Clearly, the font size of the label 2000 as determined by the ink management system 312 from corresponding digital ink for example causes overflowing of the cell 2002. A user is able to select the cell 2002 and perform a resizing operation in the direction of the arrows A and/or B, for example. FIG. 20B shows a resized typeset ink cell 2002' with the typeset ink label 2000 at the same font size fully contained therein and remaining displayed at the center as is defined for cell labels. Alternatively, the present system and method may automatically resize the container/cell so that both the minimum/normal font size and the third criteria are respected.

Such resizing of a cell beyond a pre-set, and (UI) settable, dimension threshold may cause the ink management system 312 to redefine the cell as a container, for example. In this case, the contained text is no longer defined as a label in the resized container and is treated as a text block rather than as a label. This allows other text blocks and shapes to be easily input into the resized container. Alternatively, or in addition, the loss of cell definition may occur when additional text or shapes are hand-drawn within the resized (or originally drawn sized) cell in a manner in which the HWR system 314 does not automatically link the text to the text label. The opposite conditions may be used to redefine containers as cells.

Unlike cells, typeset ink text within a container may be retained in the same relative position within the container as the digital ink text by the ink management system 312. This is achieved by positioning the typeset ink text in relation to the digital ink text bounding box, rather than the text fence of the typeset ink container. For example, the center of the typeset ink text may be centered horizontally with respect to the digital ink text block bounding box and the base-line of the typeset ink text may be retained on the base-line of the digital ink text. This positioning is also applicable for isolated or non-contained text (as in the example of FIGS. 9A and 9B where the typeset ink text 900 and 900' is centered horizontally in the bounding box 802 and on the base-line BL of the digital ink text 800) and for text related to other non-text elements, such as diagram connectors.

Figure 21:
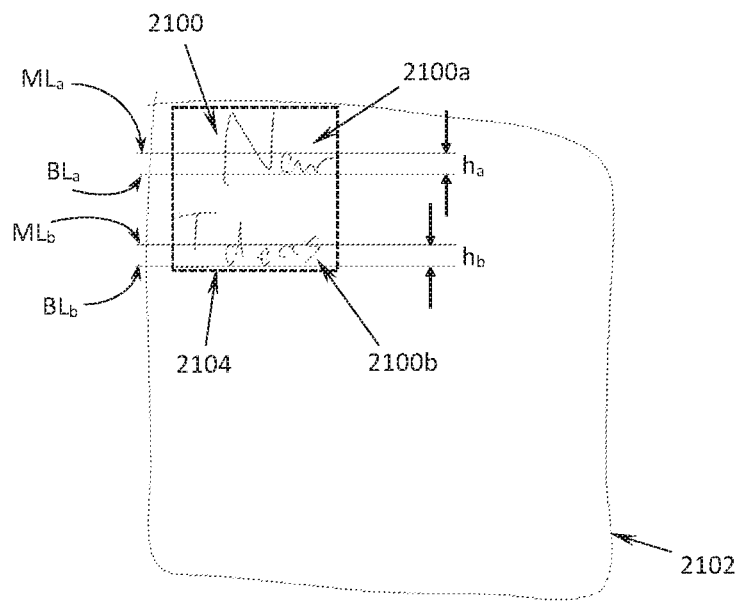
FIG. 21 shows example handwritten input rendered as a digital ink container with contained text on the input interface of the computing device depicting dimensional information of the digital ink determined in accordance with an example of the present system and method.

FIG. 21 shows example handwritten input 2100 and 2102 rendered as digital ink on the input interface 304 of the device 300, for example. The handwritten input 2100 is handwritten in multiple strokes, detected as text and recognized as the words "New Ideas" written in multiple lines of text 2100a and 2100b. The first text line 2100a includes the word "New" and the second text line 2100b includes the word "Ideas". The handwritten input 2102 is handwritten in a single continuous stroke, detected as non-text and recognized as a rectangle (or square). Further, as the recognized text 2100 is surrounded by the recognized shape 2102, the shape 2102 is detected as a container.

As can be seen, the first text line 2100a includes a capitalized character, i.e., the "N", and characters having neither ascenders nor descenders, i.e., the "e" and "w", and the second text line 2100b includes a capitalized character, i.e., the "I", a character having an ascender, i.e., the "d", and characters having neither ascenders nor descenders, i.e., the "e", "a" and "s". In order to handle the multiple digital ink text lines, the present system and method determines the corresponding dimensional information for each text line in the local font size calculation.

For the example (first) digital ink text line 2100a, the (first) top-line $TL_a$ (not shown) may be determined at the upper extent of the ascender of the second letter "N", the (first) lower-line $LL_a$ (not shown) and the (first) base-line $BL_a$ (shown) may be determined at the average of the lowest non-descender points of each of the characters, and the (first) mid-line $ML_a$ (shown) may be determined at the mid-point between the first top-line $TL_a$ and the first base-line $BL_a$. Further, as shown, the (first) text height $h_a$ is defined as the vertical distance between the first base-line $BL_a$ and the first mid-line $ML_a$ of the first digital ink text line 2100a.

For the example (second) digital ink text line 2100b, the (second) top-line $TL_b$ (not shown) may be determined at the upper extent of the ascender of the letter "I", the (second) lower-line $LL_b$ (not shown) and the (second) base-line $BL_b$ (shown) may be determined at the average of the lowest non-descender points of each of the characters, and the (second) mid-line $ML_b$ (shown) may be determined at the mid-point between the second top-line $TL_b$ and the second base-line $BL_b$. Further, as shown, the (second) text height $h_b$ is defined as the vertical distance between the second base-line $BL_b$ and the second mid-line $ML_b$ of the second digital ink text line 2100b.

Further, based on the extents of the first and second digital ink text lines 2100a and 2100b the ink management system 312 determines a text bounding box 2104 at the areal extent of the digital ink 2100 (e.g., as defined vertically by the top-line $TL_a$ of the first or upper digital ink text line 2100a and the lower-line $LL_b$ of the second or lower digital ink text line 2100b, and horizontally by the initial and last points of the digital ink 2100).

With this dimensional information of the digital ink text the HWR system 314 detects the relative positions and dimensions of the text block and non-text block, e.g., the digital ink text 2100 and the digital ink container 2102. The ink management system 312 may be configured to consider these relative positions and dimensions against pre-set, and (UI) settable, position and dimension thresholds (as described earlier) in order to determine whether the digital ink text 2100 is a text label in a cell or a text block within a container. For example, the ink management system 312 may determine the text fence of the detected container, based on margin and geometry settings as described earlier, and determine whether the sides of the text bounding box are within a certain distance(s) or threshold(s) from the respective sides of the text fence, or whether the center of the text block is within a certain distance or threshold from the center of the text fence, or whether the area of the text bounding box is within a certain area or threshold of the text fence, in order to distinguish container from cell.

In the present example, the area of the bounding box 2104 may be considered as well below the area of the text fence of the container 2102, and as such the ink management system 312 determines the digital ink text 2100 as being a text block within the container 2102. For text blocks within containers (and isolated text and text related to other non-text elements), the present system and method may calculate the local font size based on the typography-based font sizes, e.g., the height-based and area-based digital ink text size characteristics, and maintain the typesetted text block in the same relative position with respect to the typesetted container as in the digital ink. That is, only the initial step of the tiered approach is performed (with or without performance of the subsequent reflow step if desired for multi-line text). Whereas for text labels of cells, the present system and method may perform all steps of the tiered approach as necessary by calculating the local font size based on the (first) height-based and/or area-based font size characteristics, and the container-based font size characteristic if needed, and center the typesetted text block in the typesetted cell. As described earlier however, various combinations of these digital ink text size characteristics may be used by the present system and method.

Figure 22A:
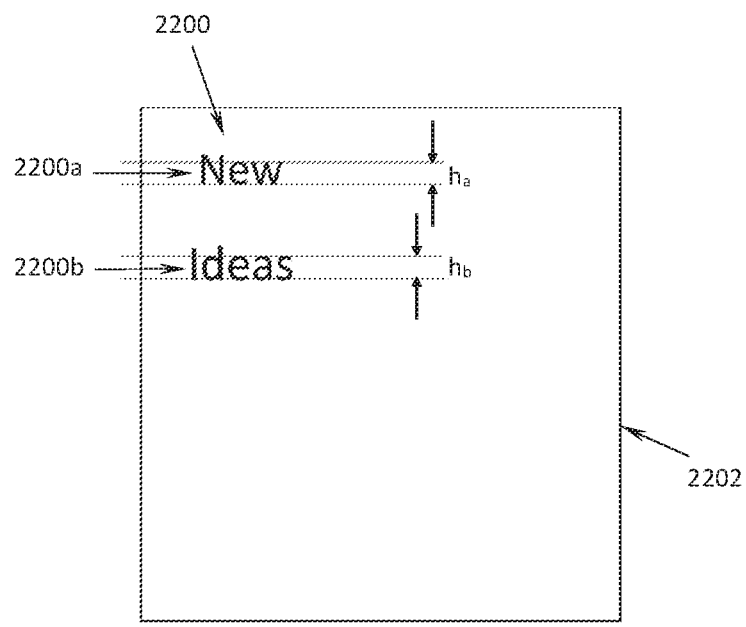
FIG. 22A illustrates example typeset ink as typeset from the digital ink of FIG. 21 with the digital ink dimensional information and multi-line text of the input typeset at height-based font sizes determined in accordance with an example of the present system and method.

Accordingly, in the present example, with respect to the height-based digital ink text size characteristic, height-based font sizes $Sh_a$ and $Sh_b$ are determined by the ink management system 312 from the respective digital ink text heights $h_a$ and $h_b$. FIG. 22A shows typeset ink text 2200 corresponding to the digital ink text 2100 with a first typeset ink text line 2200a corresponding to the first digital ink text line 2100a at the height-based font size $Sh_a$, and a second typeset ink text line 2200b corresponding to the second digital ink text line 2100b at the height-based font size $Sh_b$. In FIG. 22A the spacing between the handwritten text lines 2100a and 2100b is substantially preserved in the typeset ink text lines 2200a and 2200b, however a normalized spacing or other spacing calculated based the digital ink spacing may be used. Further, a typeset ink container 2202 corresponding to the digital ink container 2102 is shown in FIG. 22A.

As can be seen, based on the digital ink text heights $h_a$ and $h_b$ which are substantially the same, the height-based font sizes $Sh_a$ and $Sh_b$ are substantially the same as one another. Accordingly, in the example of FIG. 22A, the ink management system 312 may take the height-based font size $Sh_a$ or $Sh_b$ in the local font size calculation.

Accordingly, with respect to the area-based digital ink text size characteristic, the area-based font size Sa is determined by the ink management system 312. However, since in the present example multiple lines of text are contained, rather than the area-based font size Sa being determined by providing the width of the bounding box of the typeset ink text at substantially the same width as the bounding box of the digital ink text, the ink management system 312 is configured to determine the area-based font size Sa so that the height and width of the typeset ink text over the multiple text lines (e.g., the area of the typeset ink text block) is the substantially equal to the bounding box of the digital ink text (e.g., the area of the digital ink text block).

Figure 22B:
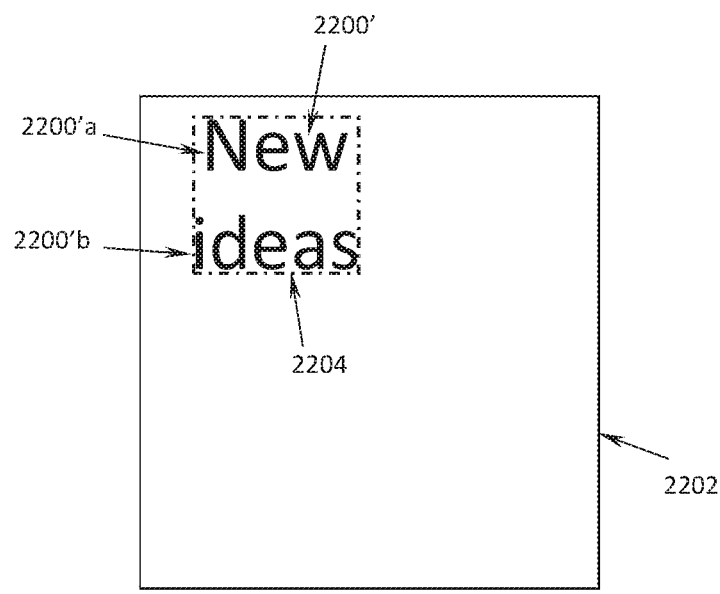
FIG. 22B illustrates example typeset ink as typeset from the digital ink of FIG. 21 with dimensional information of the typeset ink and the multi-line text of the input typeset at a container-based font size determined in accordance with an example of the present system and method.

FIG. 22B shows typeset ink text 2200' corresponding to the digital ink text 2100 with first and second typeset ink text lines 2200'a and 2200'b respectively corresponding to the first and second digital ink text lines 2100a and 2100b at the area-based font size Sa. As can be seen, the area-based font size is based on the area of the digital ink text bock (e.g., a bounding box 2204 of the typeset ink text 2200' has substantially the same area as the bounding box 2104 of the digital ink text 2100 as shown) with an inter-line spacing which is a normalized value, e.g., a pre-defined value or calculated as a percentage of the area-based font size. In FIG. 22B the typeset ink text 2200 is shown as centered in the bounding box 2204, however other alignments may be provided, such as left justified, right justified, or the relative position of the digital ink with respect the digital ink bounding box may be preserved.

Figure 22C:
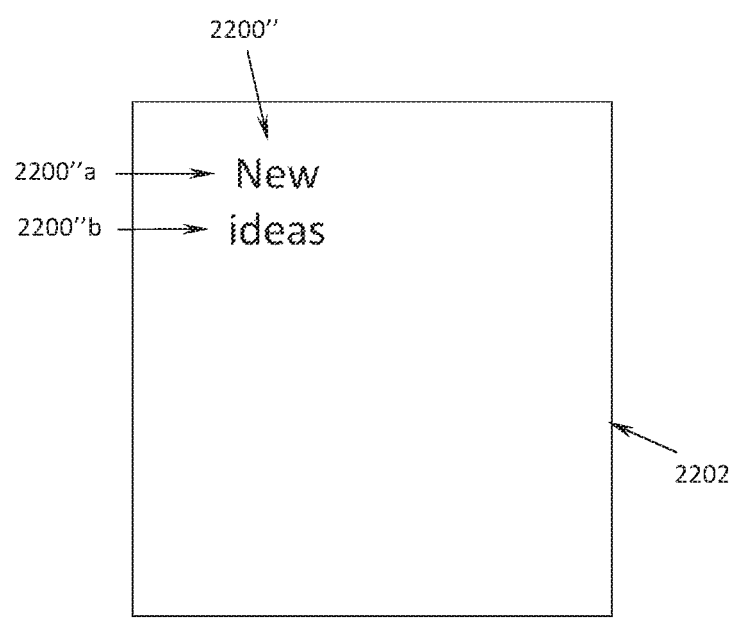
FIG. 22C shows example typeset ink rendered as typeset from the digital ink of FIG. 21 on the input interface of the computing device with multi-line text of the input typeset at one of the height-based font sizes of FIG. 22A and normalized in accordance with an example of the present system and method.

Further, as shown in FIGS. 22A and 22B, the relative position of the typeset ink text block 2200 and 2200' within the typeset ink container 2202 is substantially maintained with respect to the relative position of the digital ink text block 2100 within the digital ink container 2102. This relative position is maintained upon selection of the smallest of the height- and area-based font sizes by the ink management system 312. In the present example, the height-based font size $Sh_a$ (or $Sh_b$) is selected as the local font size resulting in the typeset output illustrated in FIG. 22C which shows typeset ink text 2200" corresponding to the digital ink text 2100 with a first and second typeset ink text lines 2200"a and 2200"b respectively corresponding to the first and second digital ink text lines 2100a and 2100b at the height-based font size $Sh_a$ with a normalized inter-line spacing. Further, the typeset ink text 2200" is shown as centered in the text block, however other alignments may be provided, such as left justified, right justified, or the relative position of the digital ink with respect to the digital ink bounding box may be preserved.

Alternatively, the present system and method may cause the position of the text block to be adjusted based on the text fence of the container when there is space within the container, such as centering the text block within the text fence, and therefore the container.

Figure 23:
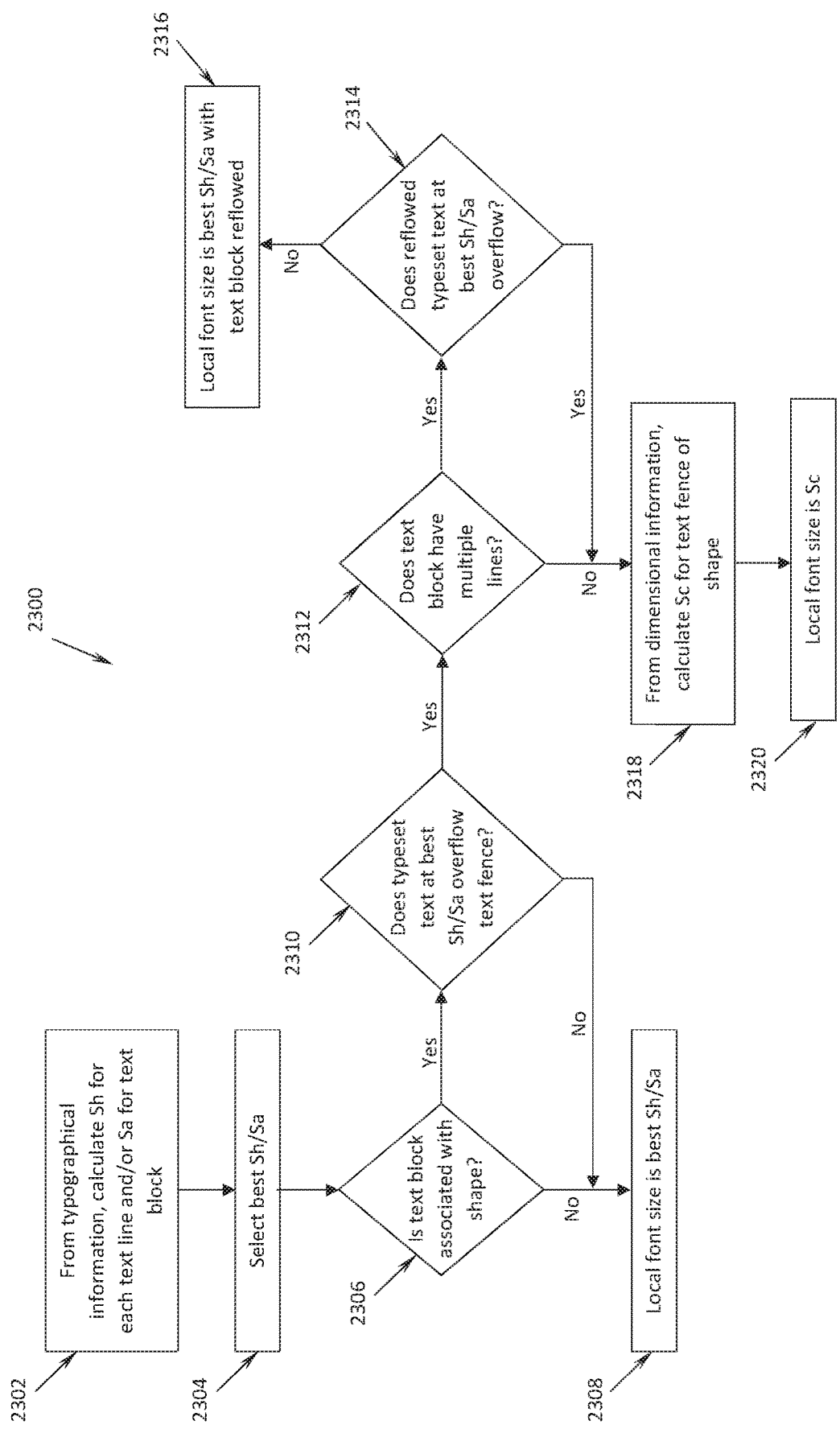
FIG. 23 shows a flow chart of local font size calculation in accordance with an example of the present system and method.

FIG. 23 shows a flow chart of local font size calculation of the present system and method describing an example process 2300 of the afore-described tiered approach on handwritten content input including at least text. The example process 2300 is illustrated with a series of steps 2302 to 2320 performed by the ink management system 312 in the depicted order. It is understood that the number of steps and the order thereof are an example, and a fewer or greater number of steps, combination or splitting of the steps and/or a different order of the steps are possible in the present system and method. Further, the example process 2300 is described in relation to one or more blocks of text each having one more lines of text, as recognized by the HWR system 314 for example. It is understood that the described steps may be performed by the ink management system 314 for all text blocks at once in response to a typesetting demand received from a user via the input interface 304 of the device 300, for example, or may be performed in turn for each text block/line on-the-fly (described in detail later) as text and non-text content is input and interpreted by the HWR system 312.

At step 2302, the typographical information of the digital ink text is used by the ink management system 312 to calculate the typography-based text size characteristics as the height-based font size Sh for each text line of each block of text and/or the area-based font size Sa for each text block.

At step 2304, the best value of each height-based font size Sh for each text line and/or the area-based font size Sa for each text block is selected by the ink management system 312, based on pre-defined conditions. For example, as described earlier, the 'best' value may be the smallest, the largest, the mean, the average, etc., font size of the calculated font sizes for that text block and its associated one or more text lines.

At step 2306, the ink management system 312 determines whether each text block is associated with a shape, e.g., a container. If it is determined that a text block is not associated with a shape, e.g., the text block is isolated, a "No" is returned as shown and processing proceeds to step 2308, at which the selected best value of the height-based font size Sh and/or area-based font size Sa is returned as the local font size for that text block. If it is determined that a text block is associated with a shape, e.g., the text block is contained, a "Yes" is returned as shown and processing proceeds to step 2310 for that text block.

At step 2310, for each respective text block, the dimensional information of the associated typeset recognized shape is used by the ink management system 312 to determine whether typeset text of the associated text block at the selected best value of the height-based font size Sh and/or area-based font size Sa overflows the text containment element of the associated shape. If it is determined that the typeset text of a text block does not overflow the text containment element of the associated shape a "No" is returned as shown and processing proceeds to step 2308, at which the selected best value of the height-based font size Sh and/or area-based font size Sa is returned as the local font size for that text block. If it is determined that the typeset text of a text block does overflow the text containment element of the associated shape a "Yes" is returned as shown and processing proceeds to step 2312 for that text block.

At step 2312, for each respective text block, the typographical information of the digital ink text is used by the ink management system 312 to determine if multiple text lines are present for each text block. If it is determined that a text block does have multiple text lines a "Yes" is returned as shown and processing proceeds to step 2314 for that text block.

At step 2314, for each respective text block, the ink management system 312, either alone or in conjunction with the HWR system 314, determines whether the detected multiple lines of text can be reflowed as typeset text at the selected best value of the height-based font size Sh and/or area-based font size Sa so as to be contained within the text containment element of the associated shape. If it is determined that the reflowed typeset text of a text block does not overflow the text containment element of the associated shape a "No" is returned as shown and processing proceeds to step 2316, at which the selected best value of the height-based font size Sh and/or area-based font size Sa is returned as the local font size for that text block with the typeset text reflowed.

If, at step 2314, it is determined that the reflowed typeset text of a text block does overflow the text containment element of the associated shape a "Yes" is returned as shown and processing proceeds to step 2318 for that text block. Similarly, if, at step 2312, it is determined that a text block does not have multiple text lines a "No" is returned as shown and processing proceeds to step 2318 for that text block.

At step 2318, for each respective text block, the dimensional information of each associated typeset recognized shape is used by the ink management system 312 to calculate the dimensional-based text size characteristic as the container-based font size Sc for each associated block of text. Processing then proceeds to step 2320, at which the container-based font size Sc is returned as the local font size for each associated text block.

Figure 24:
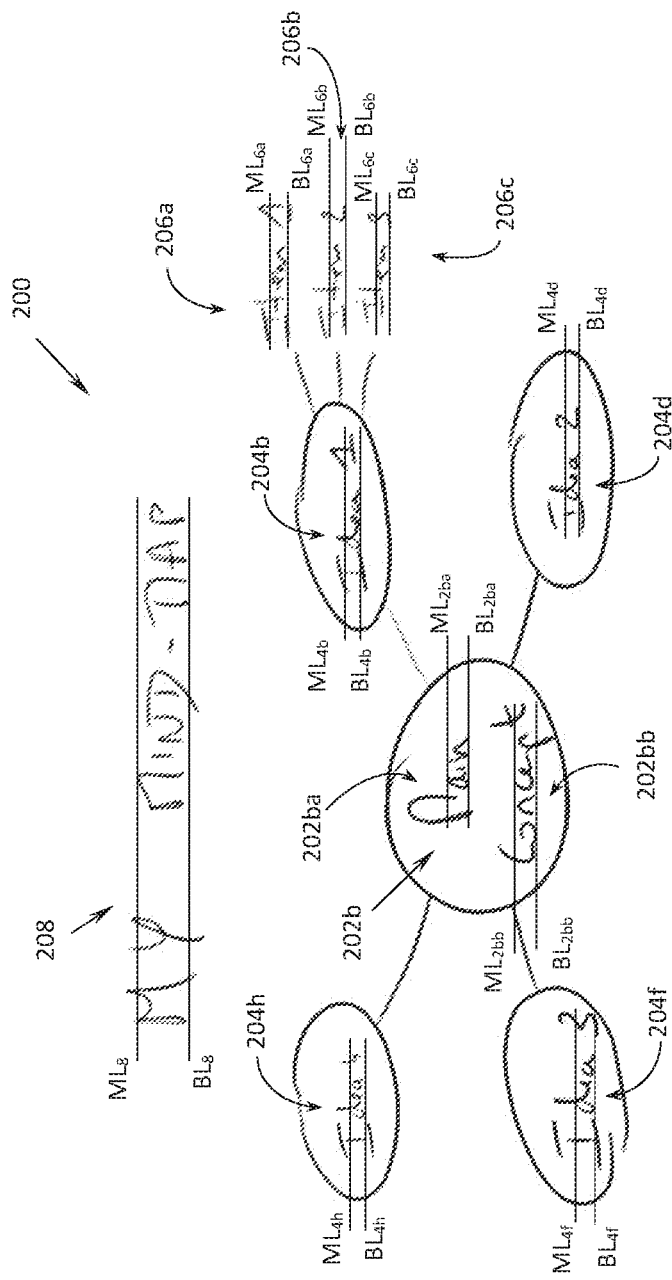
FIG. 24 illustrates the example digital ink mind-map diagram of FIG. 2 with dimensional information of the digital ink determined in accordance with an example of the present system and method.
Figure 25:
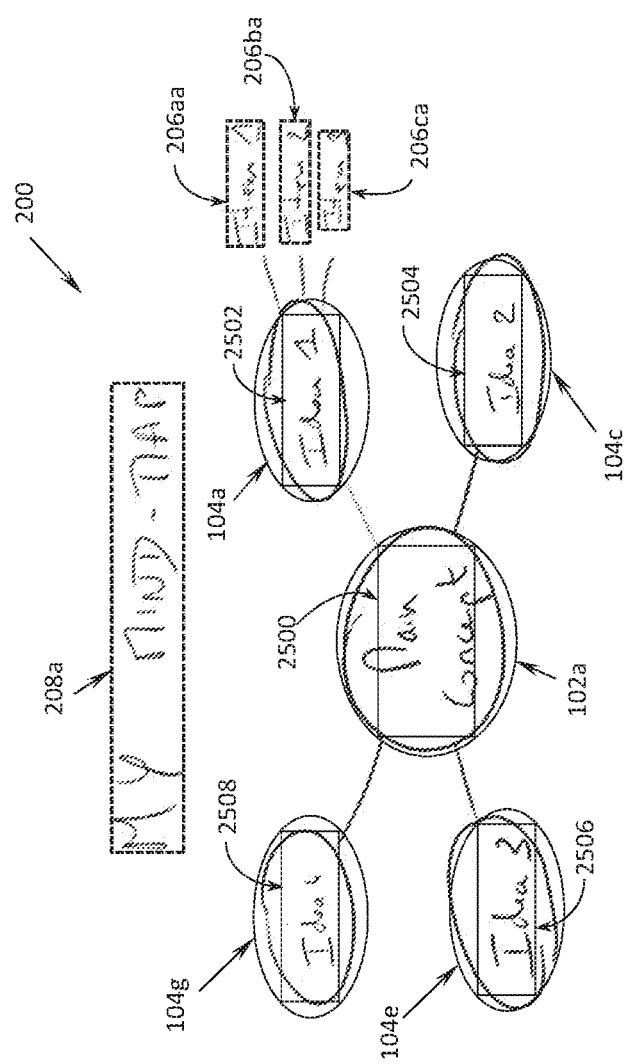
FIG. 25 illustrates the example digital ink mind-map diagram of FIG. 2 with dimensional information of some of the digital ink, example typeset ink over some of the digital ink and dimensional information of the typeset ink determined in accordance with an example of the present system and method.

Returning to the example of FIG. 2, with respect to the local font size calculation for the diagram 200 as determined by the ink management system 312, FIG. 24 shows the associated text height typography of the digital ink text elements 202*b*, 204*b*, 204*d*, 204*f*, 204*h*, 206*a*, 206*b*, 206*c* and 208, and FIG. 25 shows the associated text area typography of the digital ink text elements 206*a*, 206*b*, 206*c* and 208 and associated text fences of typeset ink shapes corresponding to the digital ink shape elements 204*a*, 204*c*, 204*e* and 204*g*. In FIG. 25, the typeset ink containers 102*a*, 104*a*, 104*c*, 104*e* and 104*g* of the typeset ink diagram 100 are shown respectively over the digital ink containers 202*a*, 204*a*, 204*c*, 204*e* and 204*g* of the digital ink diagram 200 for illustration purposes.

In the local font size calculation of this example, for text blocks determined to be isolated, both the height- and area-based text size characteristics are measured based on the typographical information, and for text blocks determined to be associated with a shape, e.g., contained, the height-based text size characteristic only is measured based on the typographical information, compared to the dimensional information of the typeset shape as recognized in either non-reflowed or reflowed manners, as necessary, and then the shape scaled font size calculated if necessary. This is just an example however, and the area-based text size characteristic may be measured for all text blocks in the local font size calculation.

For the text 208 "MY MIND-MAP" of the title element the top-line $TL_8$ (not shown) is at the upper extent of the ascender of the initial letter "M", the lower-line $LL_8$ (not shown) and the base-line $BL_8$ (shown) is at the average of the lowest non-descender points of each of the characters, and the mid-line $ML_8$ (shown) is defined as the cap-line which is at a pre-defined point between the top-line $TL_8$ and the base-line $BL_8$ as all of the characters are capitalized. Based on this typography, a text height h of about 11.5 mm is measured by the ink management system 312, such that a height-based font size $Sh_8$ of 33 pt is calculated (e.g., using a conversion of 1 pt=0.3528 mm and rounding up). Whereas, based on a bounding box 208*a* of the (isolated) text 208, an area-based font size $Sa_8$ of 36 pt is calculated. Accordingly, the smallest of the height-based and area-based font sizes is selected, such that a local font size of 33 pt is calculated.

For the text 202*b* "Main Concept" of the first level node 202, as there are two text lines 202*ba* and 202*bc* as illustrated in FIG. 23, the typography of the individual text lines is determined and the text fence for both lines is determined.

Accordingly, for the text line 202*ba* "Main" the top-line $TL_{2ba}$ (not shown) is at the upper extent of the ascender of the letter "M", the lower-line $LL_{2ba}$ (not shown) and the base-line $BL_{2ba}$ (shown) is at the average of the lowest non-descender points of each of the characters, and the mid-line $ML_{2ba}$ (shown) is at the mid-point between the top-line $TL_{2ba}$ and the base-line $BL_{2ba}$. Based on this typography, a text height h of about 4.9 mm is measured by the ink management system 312, such that a height-based font size $Sh_{2ba}$ of 14 pt is calculated.

For the text line 202*bb* "Concept" the top-line $TL_{2bb}$ (not shown) is at the upper extent of the ascender of the letter "t", the lower-line $LL_{2bb}$ (not shown) is at the lower extent of the descender of the letter "p", the base-line $BL_{2bb}$ (shown) is at the average of the lowest non-descender points of each of the characters, and the mid-line $ML_{2bb}$ (shown) is at the mid-point between the top-line $TL_{2bb}$ and the lower-line $LL_{2bb}$. Based on this typography, a text height h of about 4.8 mm is measured by the ink management system 312, such that a height-based font size $Sh_{2bb}$ of 14 pt is calculated.

As the height-based font sizes for each of the text lines of the text block 202*b* are the same, the height-based font size is selected as 14 pt. Based on the typeset ink container 102*a*, a text fence 2500 is defined and it is determined that typeset text at the height-based font size of 14 pt does not overflow the text fence 2500. As such, the height-based font size is selected without need to determine reflow in a subsequent step, resulting in a local font size of 14 pt. For completeness, it is noted that the container-based font size is 18 pt (based on the area of the text fence 2500), which is greater than the height-based font size in any case.

For the text 204*b* "Idea 1" of the (first) second level node 204 the top-line $TL_{4b}$ (not shown) is at the upper extent of the ascender of the letter "I", the lower-line $LL_{4b}$ (not shown) and the base-line $BL_{4b}$ (shown) is at the average of the lowest non-descender points of each of the characters, and the mid-line $ML_{4b}$ (shown) is at the mid-point between the top-line $TL_{4b}$ and the base-line $BL_{4b}$. Based on this typography, a text height h of about 3.4 mm is measured by the ink management system 312, such that a height-based font size $Sh_{4b}$ of 10 pt is calculated. Based on the typeset ink container 104*a*, a text fence 2502 is defined and it is determined that typeset text at the height-based font size of 10 pt does not overflow the text fence 2502. As such, the height-based font size is selected without need to determine the container scaled font size, resulting in a local font size of 10 pt. For completeness, it is noted that the container-based font size is 28 pt (based on the width of the text fence 2502), which is greater than the height-based font size in any case.

For the text 204d "Idea 2" of the (second) second level node 204 the top-line $TL_{4d}$ (not shown) is at the upper extent of the ascender of the letter "I", the lower-line $LL_{4d}$ (not shown) and the base-line $BL_{4d}$ (shown) is at the average of the lowest non-descender points of each of the characters, and the mid-line $ML_{4d}$ (shown) is at the mid-point between the top-line $TL_{4d}$ and the base-line $BL_{4d}$. Based on this typography, a text height h of about 3.3 mm is measured by the ink management system 312, such that a height-based font size $Sh_{4d}$ of 9 pt is calculated. Based on the typeset ink container 104c, a text fence 2504 is defined and it is determined that typeset text at the height-based font size of 9 pt does not overflow the text fence 2504. As such, the height-based font size is selected without need to determine the container scaled font size, resulting in a local font size of 9 pt. For completeness, it is noted that the container-based font size is 28 pt (based on the width of the text fence 2504), which is greater than the height-based font size in any case.

For the text 204f "Idea 3" of the (third) second level node 204 the top-line $TL_{4f}$ (not shown) is at the upper extent of the ascender of the letter "I", the lower-line $LL_{4f}$ (not shown) and the base-line $BL_{4f}$ (shown) is at the average of the lowest non-descender points of each of the characters, and the mid-line $ML_{4f}$ (shown) is at the mid-point between the top-line $TL_{4f}$ and the base-line $BL_{4f}$. Based on this typography, a text height h of about 3.5 mm is measured by the ink management system 312, such that a height-based font size $Sh_{4f}$ of 10 pt is calculated. Based on the typeset ink container 104e, a text fence 2506 is defined and it is determined that typeset text at the height-based font size of 10 pt does not overflow the text fence 2506. As such, the height-based font size is selected without need to determine the container scaled font size, resulting in a local font size of 10 pt. For completeness, it is noted that the container-based font size is 28 pt (based on the width of the text fence 2506), which is greater than the height-based font size in any case.

For the text 204h "Idea 4" of the (fourth) second level node 204 the top-line $TL_{4h}$ (not shown) is at the upper extent of the ascender of the letter "I", the lower-line $LL_{4h}$ (not shown) and the base-line $BL_{4h}$ (shown) is at the average of the lowest non-descender points of each of the characters, and the mid-line $ML_{4h}$ (shown) is at the mid-point between the top-line $TL_{4h}$ and the base-line $BL_{4h}$. Based on this typography, a text height h of about 3.3 mm is measured by the ink management system 312, such that a height-based font size $Sh_{4h}$ of 9 pt is calculated. Based on the typeset ink container 104g, a text fence 2508 is defined and it is determined that typeset text at the height-based font size of 9 pt does not overflow the text fence 2508. As such, the height-based font size is selected without need to determine the container scaled font size, resulting in a local font size of 9 pt. For completeness, it is noted that the container-based font size is 28 pt (based on the width of the text fence 2508), which is greater than the height-based font size in any case.

It is noted that each of the typeset ink containers 104a, 104c, 104e and 104g have the same dimensions (as depicted in FIG. 1) such that the respective text fences 2502, 2504, 2506 and 2508 have the same dimensions. This result may be obtained for example by the HWR system 314, or the ink management system 312, normalizing the detected container dimensions for containers of the same hierarchical level as interpreted by the HWR system 314. This normalization can be performed in a number of ways, such as setting all containers of the same level to the dimensions of the smallest or largest container, or to the average or mean container dimensions, in consideration of the effect on the local typeset ink font size of any contained text. In the illustrated example, the dimensions of the largest hand-drawn oval of the second-level nodes 204, namely the oval 204e, is taken. Such normalization may not be performed if desired however while maintaining adherence to the first and second criteria, such that a typeset result as in FIG. 6 or FIG. 7 results rather than that in FIG. 1.

For the text 206a "Item 1" of the (first) third level node 206 the top-line $TL_{6a}$ (not shown) is at the upper extent of the ascender of the letter "t", the lower-line $LL_{6a}$ (not shown) and the base-line $BL_{6a}$ (shown) is at the average of the lowest non-descender points of each of the characters, and the mid-line $ML_{6a}$ (shown) is at the mid-point between the top-line $TL_{6a}$ and the base-line $BL_{6a}$. Based on this typography, a text height h of about 3.4 mm is measured by the ink management system 312, such that a height-based font size $Sh_{6a}$ of 10 pt is calculated. Whereas, based on a bounding box 206aa of the (isolated) text 206a, an area-based font size $Sa_{6a}$ of 20 pt is calculated. Accordingly, the smallest of the height-based and area-based font sizes is selected, such that a local font size of 10 pt is calculated.

For the text 206b "Item 2" of the (second) third level node 206 the top-line $TL_{6b}$ (not shown) is at the upper extent of the ascender of the number "1", the lower-line $LL_{6b}$ (not shown) and the base-line $BL_{6b}$ (shown) is at the average of the lowest non-descender points of each of the characters, and the mid-line $ML_{6b}$ (shown) is at the mid-point between the top-line $TL_{6b}$ and the base-line $BL_{6b}$. Based on this typography, a text height h of about 3.3 mm is measured by the ink management system 312, such that a height-based font size $Sh_{6b}$ of 9 pt is calculated. Whereas, based on a bounding box 206ba of the (isolated) text 206b, an area-based font size $Sa_{6b}$ of 18 pt is calculated. Accordingly, the smallest of the height-based and area-based font sizes is selected, such that a local font size of 9 pt is calculated.

For the text 206c "Item 3" of the (third) third level node 206 the top-line $TL_{6c}$ (not shown) is at the upper extent of the ascender of the letter "t", the lower-line $LL_{6c}$ (not shown) and the base-line $BL_{6c}$ (shown) is at the average of the lowest non-descender points of each of the characters, and the mid-line $ML_{6c}$ (shown) is at the mid-point between the top-line $TL_{6c}$ and the base-line $BL_{6c}$. Based on this typography, a text height h of about 3.1 mm is measured by the ink management system 312, such that a height-based font size $Sh_{6c}$ of 9 pt is calculated. Whereas, based on a bounding box 206ca of the (isolated) text 206c, an area-based font size $Sa_{6c}$ of 14 pt is calculated. Accordingly, the smallest of the height-based and area-based font sizes is selected, such that a local font size of 9 pt is calculated.

Thus, if typesetting was performed for the digital ink diagram 200 based on these different calculated local font sizes for the diagram text block elements, the undesired typeset ink diagram 700 would result. While the first criteria may be satisfied by this typesetting, without some normalization across text blocks the second criteria is not satisfied. As described earlier, the ink management system 312 provides this normalization by categorizing the text blocks into categories to which respective font sizes may be defined, e.g., the afore-described second step of the three typesetting steps. This is done by sorting the text blocks into groups based on the determined dimensional information of the handwritten input, and/or the determined dimensional information of the recognized containers/cells, and/or the detected structure of the content, and determining an appropriate font size for each category so that the first, second and third criteria are satisfied.

With respect to the dimensional information, aspects of the typography of the handwritten input or the local font sizes are used by the ink management system 312 to provide categorization so that the first and second criteria are satisfied. With respect to the structure, interpreted relationships of the text and non-text shapes are used by the ink management system 312 to provide categorization so that the first and second criteria are satisfied.

With respect to the typography, the ink management system 312 may compare the determined text heights h to determine the ratio of increase between the height values. These ratios are compared against one or more thresholds in order to group the text blocks having the respective text heights into different categories. For example, the ink management system 312 compares the text heights in ascending order from the smallest text height and determines the ratio of each compared pair of text heights. It is understood that more or different typographic information that the digital ink text heights on character, word, line and text block levels could also be used by the present system and method for such comparisons.

Table 1 includes the text heights of the text blocks 202b (including the text lines 202ba and 202bb), 204b, 204d, 204f, 204h, 206a, 206b, 206c and 208 sorted in ascending order. The percentage increase (e.g., ratio) between each sorted pair is also included. It is understood that other comparison models are possible, such as comparing all text heights to the smallest or largest text height, determining the average or mean text height and determining deviation of the text heights from this value, (adaptive) clustering algorithms.

TABLE 1

| text block | digital ink text height (mm) | increase from previous height (%) | new category? | assigned category |
|---|---|---|---|---|
| 206c "Item 3" | 3.1 | — | Yes | 1 |
| 206b "Item 2" | 3.3 | 6% | No | 1 |
| 204d "Idea 2" | 3.3 | 0% | No | 1 |
| 204h "Idea 4" | 3.3 | 0% | No | 1 |
| 206a "Item 1" | 3.4 | 3% | No | 1 |
| 204b "Idea 1" | 3.4 | 0% | No | 1 |
| 204f "Idea 3" | 3.5 | 3% | No | 1 |
| 202bb "Concept" | 4.8 | 37% | Yes | 2 |
| 202ba "Main" | 4.9 | 2% | No | 2 |
| 208 "MY MIND-MAP" | 11.5 | 135% | Yes | 3 |

The text block(s) with the smallest text height is assigned by the ink management system 312 to a (first) base category "1". In Table 1 this is the text block 206c. A new category is assigned when the ratio or percentage increase of text height is greater than a pre-defined, and/or for example UI settable, threshold. The threshold is set so that the first criteria remains satisfied. That is, so that relatively significant differences in handwritten text sizes are represented in the typeset version. In the example of Table 1 the threshold is set at about 20%. The one or more thresholds may be set manually, e.g., pre-set and/or via the UI, or dynamically determined from the ink input itself.

Accordingly, each of the text blocks 204b, 204d, 204f, 204h, 206a and 206b which each have a text height increase over the previously smaller text height of less than 20% are all assigned to the base category. At the text line 202bb the text height difference from the previously smaller text height is over the threshold and therefore the ink management system 312 assigns this text line to a (second) subsequent category "2". The text line 202ba has a text height increase over that of the text line 202bb of less than 20% and is therefore assigned to the same category. At the text block 208 the text height difference from the previously smaller text height is over the threshold and therefore the ink management system 312 assigns this text block to a (third) last category "3".

Based on this text block categorization it can be seen that the title block 208 of the diagram 200 is included in its own category, the text block 202b of the (first-level) central node 202 is included in its own category and the text blocks of the (second-level) branched nodes 204 and (third-level) list nodes 206 are included in the same category. Further or less granularity of this categorization may be provided by adjusting the threshold, by defining and applying a set of thresholds for different hierarchical levels, for example, or by comparing different typographical information, such as the local font sizes. In this way the typeset ink text elements or blocks corresponding to the digital ink text elements or blocks are similarly categorized.

For example, the ink management system 312 may compare the determined local font sizes to determine the ratio of increase between the values. As before, these ratios are compared against one or more thresholds in order to group the text blocks having the respective text heights into different categories. For example, the ink management system 312 compares the local font sizes in ascending order from the smallest and determines the ratio of each compared pair.

Table 2 includes the local font sizes of the text blocks 202b (as the local font size is for the entire block 202b the text lines 202ba and 202bb are not included), 204b, 204d, 204f, 204h, 206a, 206b, 206c and 208 sorted in ascending order. The percentage increase (e.g., ratio) between each sorted pair is also included. It is understood that other comparison models are possible, such as comparing all local font sizes to the smallest or largest local font size, determining the average or mean local font size and determining deviation of the local font sizes from this value, etc.

TABLE 2

| text block | local font size (pt) | increase from previous font size (%) | new category? | assigned category |
|---|---|---|---|---|
| 206c "Item 3" | 9 | — | Yes | 1 |
| 206b "Item 2" | 9 | 0% | No | 1 |
| 204d "Idea 2" | 9 | 0% | No | 1 |
| 204h "Idea 4" | 9 | 0% | No | 1 |
| 206a "Item 1" | 10 | 11% | No | 1 |
| 204b "Idea 1" | 10 | 0% | No | 1 |
| 204f "Idea 3" | 10 | 0% | No | 1 |
| 202b "Main Concept" | 14 | 40% | Yes | 2 |
| 208 "MY MIND-MAP" | 33 | 136% | Yes | 3 |

The text block(s) with the smallest local font size is assigned by the ink management system 312 to the (first) base category "1". In Table 2 this is the text block 206c. The threshold is set as before, and in the example of Table 2 the threshold is set at about 20%.

Accordingly, each of the text blocks 204b, 204d, 204f, 204h, 206a and 206b which each have a local font size increase over the previously smaller local font size of less than 20% are all assigned to the base category. At the text block 202b the local font size difference from the previously smaller local font size is over the threshold and therefore the ink management system 312 assigns this text block to the (second) subsequent category "2". At the text block 208 the local font size difference from the previously smaller local font size is over the threshold and therefore the ink management system 312 assigns this text block to the (third) last category "3". In this way the typeset ink text elements or blocks corresponding to the digital ink text elements or blocks are similarly categorized.

The text block categorization based on the local font size is therefore the same as that based on the text height. This is the case in the present example since each of the local font sizes were determined to be the height-based font size Sh of each text block of the handwritten input. However, for handwritten diagram and other structured input for which the local font size of the text blocks is determined as the area-based or container-based font sizes, the comparisons between text height and local font size may provide different categorization results. Accordingly, the ink management system 312 may be configured to perform multiple comparison models on different typographical and structural information of the digital and typeset ink and use the comparison result for typesetting that best adheres to the first and second (and third) criteria, or these various model options may be provided for selection by users.

Additionally, or alternatively, the ink management system 312 may use the relationships of the content elements interpreted by the HWR system 314 to provide or augment the text block categorization. For example, the relationships of diagram elements detected by the HWR system 314 which determines the hierarchical structure could be used so that each text element of each level of the hierarchy are assigned to respective categories by the ink management system 312 or the assignments made based on the typographical information of the text elements adjusted based on the hierarchical levels.

For the example diagram 200 the ink management system 312 may assign the categories as included in Table 3 which includes the nodes and hierarchical levels of the text blocks 202b, 204b, 204d, 204f, 204h, 206a, 206b, 206c and 208 sorted in descending order.

TABLE 3

| text block | node | hierarchy level | new category? | assigned category |
|---|---|---|---|---|
| 206a "Item 1" | 3 | third | Yes | 1 |
| 206b "Item 2" | 3 | third | No | 1 |
| 206c "Item 3" | 3 | third | No | 1 |
| 204b "Idea 1" | 2 | second | Yes | 2 |
| 204d "Idea 2" | 2 | second | No | 2 |
| 204f "Idea 3" | 2 | second | No | 2 |
| 204h "Idea 4" | 2 | second | No | 2 |
| 202b "Main Concept" | 1 | first | Yes | 3 |
| 208 "MY MIND-MAP" | 0 | title | Yes | 4 |

The text block(s) at the lowest hierarchical level is assigned by the ink management system 312 to the (first) base category "1" and then subsequently higher levels are assigned to the subsequent categories. Thus in Table 3, the text blocks 206a, 206b and 206c of the third level nodes 206 are assigned to the base category, the text blocks 204b, 204d, 204f, 204h of the second level nodes 204 are assigned to the (second) subsequent category "2", the text block 202b of the first level node 202 is assigned to the (third) subsequent category "3", and the text block 208 of the title node is assigned to the (fourth) last category "4". In this way the typeset ink text elements or blocks corresponding to the digital ink text elements or blocks are similarly categorized.

As can be seen, this provides a further category than the models of Tables 1 and 2, The effect of this further category on the typeset result and whether the first and second criteria are satisfied based on this effect is discussed below.

In order to provide consistency of the font size in each category thereby ensuring satisfaction of the first and second criteria, the ink management system 312 applies global font size normalization to produce a normalized (second) font size for the typeset ink text, e.g., the afore-described third step of the three typesetting steps. In the simplest form this is achieved by applying the smallest local typeset ink font size calculated for the text blocks of each (created) category to the text blocks of that category in the final typeset result, thereby determining the normalized (second) font size based on the appropriate local (first) font size of each category. Alternatively, an average or mean value could be used while retaining adherence to the first and second criteria.

As such for the example diagram 200, as seen from Table 2, for the first category 1 the smallest local font size is 9 pt such that the text blocks 206a, 206b and 206c of the third level nodes 206 and the text blocks 204b, 204d, 204f, 204h of the second level nodes 204 are typeset with that font size, for the second category 2 the (smallest) local font size 14 pt such that the text block 202b of the first level node 202 is typeset with that font size, and for the third category 3 the (smallest) local font size 33 pt such that the text block 208 of the (zeroth) title node is typeset with that font size. As a result, the typeset ink diagram 100 depicted in FIG. 1 is produced.

The local font sizes may be scaled by one or more pre-defined, and/or UI settable, scaling factors based on category (or hierarchy level). For example, a (global) scaling factor of about 80% may be applied to provide a more professional looking typeset output, such as providing the afore-described 'normal' font size for paragraph text, for example.

With respect to the alternative categorization as in Table 3, it is noted that for the first category 1 the smallest local font size is 9 pt such that the text blocks 206a, 206b and 206c of the third level nodes 206 are still typeset with that font size, for the second category 2 the smallest local font size is also 9 pt such that the text blocks 204b, 204d, 204f, 204h of the second level nodes 204 are still typeset with that font size, for the third category 3 the (smallest) local font size 14 pt such that the text block 202b of the first level node 202 is still typeset with that font size, and for the fourth category 4 the (smallest) local font size 33 pt such that the text block 208 of the (zeroth) title node is still typeset with that font size. As a result, the typeset ink diagram 100 depicted in FIG. 1 is still produced.

However, if, for example, all of the local font sizes for the second category 2 had been calculated as 10 pt (e.g., the local font sizes for the text blocks 204d and 204h were calculated as 10 pt as well, not 9 pt), the text blocks 204b, 204d, 204f, 204h of the second level nodes 204 would be typeset at a font size of 10 pt. Accordingly, the level difference between the second level and third level content may be emphasized in the final typeset diagram. However, this may be considered as not satisfying the first and second criteria as the handwritten input of FIG. 2 does not have a substantial difference in scale between the second and third level nodes 204 and 206 and the same text size is not used for all of the text blocks of the second and third level nodes 204 and 206 that have been roughly handwritten with the same scale. Having said this, since most of the third level text 206 is handwritten at a smaller size than the second level text 204 it may also be considered that the first and second criteria are met and the user intention of different emphasis for different levels of the diagram is better reflected with such categorization. Further, the earlier described discrete pre-set or dynamically definable font size levels of, e.g., small, normal, large, extra-large, could be used by the ink management system 312 to provide such distinct level differences.

The afore-described examples relate to typesetting of digital handwritten content at a point in time after handwriting input. That is, after the handwritten diagram 200 has been input typesetting of the input content is caused by the user performing a gesture with respect to the input interface 304 of the device 300 to select a menu element or button or to input a handwritten typesetting command, for example. The present system and method is also applicable to substantially real-time or 'on-the-fly' typesetting in which typeset ink is rendered in place (or instead) of the digital ink as the user inputs the handwriting.

In such a use case however, the Applicant has found that users are disturbed in their continued input by changes to the typesetting as input progresses. That is, based on the afore-described processing, if subsequent input at the same hierarchical level of previously typeset content is calculated to have a local typeset ink font size that is smaller than the previously typeset ink font size, the previous content would be re-typeset to reduce the font size based on the categorization and normalization. This may be avoided, for example, by omitting the normalization during on-the-fly typesetting. However, this would result in different font sizes for the same diagram levels (as in the example of FIG. 7) thereby contravening the second criteria.

Alternatively, the normalization could be carried out after input is completed, based on receipt of a 'final' typesetting command by the user via the input interface 3014 of the device 300, for example, or after a certain amount of time has elapsed, e.g., about one second to about 5 seconds, since detection of the last pen-up event by the ink management system 312, for example.

Alternatively still, at least the normalization may be performed based on the typeset ink font size of the already rendered typeset ink text in each category. For example, if the text 204b of the second level node 204 is input prior to the text 204d, 204f and 204h, the resulting typeset ink font size for all of these text blocks would be 10 pt instead of 9 pt. Such a result may satisfy the second criteria, but the third criteria may be contravened (if adherence is desired) unless container size normalization (as described earlier) is also performed.

Additionally, or alternatively, the ink management system 312 may be configured to, for on-the-fly typesetting, typeset digital ink text with one or more pre-defined and/or dynamically definable font sizes (such as the normal and levelled font sizes, as described earlier) and typesetting associated shapes, such as containers, so that the typeset text does not overflow, and, for on-demand typesetting, calculating and determining the appropriate typeset font sizes, as described herein. In this case, the ink management system 312 may be further configured to allow on-demand 're-typesetting' with the calculated and determined appropriate typeset font sizes, as described herein, for previously on-the-fly typeset content.

By the present system and method, the text (and non-text) size of handwritten input is respected through considering dimensional and geometrical information of the digital ink representing the handwritten input and (potential) typeset ink produced through HWR recognition of the handwritten input. In this way the ink management of the present system and method provides improvement to the look of typeset converted handwritten structured ink content while respecting users' intentions in expressing and emphasizing different content elements through different handwriting sizes. In this way, the need for users to explicitly adjust the typeset font size to improve the typeset conversion is minimized leading to improved user experience and productivity gains.

As described, text block categorization and optimal font size calculation are provided based on local and global observations on the digital and typeset ink of the structured content. The described system and method may use rules or heuristics to provide the observations or may alternatively, or additionally, utilize machine learning, for example, to categorize what are the different hierarchal levels of the structured content based on the type of content and training on a large dataset.

While the foregoing has described what are considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for managing typesetting of digital ink structured content on a computing device, the computing device comprising a processor and at least one non-transitory computer readable medium for recognizing handwriting input under control of the processor, the at least one non-transitory computer readable medium configured to:
   detect one or more inputs forming at least a plurality of digital ink text elements of structured content;
   determine dimensional information of at least the plurality of digital ink text elements of structured content;
      wherein the dimensional information comprises geometrical information and typographical information of at least the plurality of digital ink text elements of structured content;
   calculate a first font size for each of a plurality of typeset ink text elements respectively corresponding to the digital ink text elements based on the dimensional information;
   categorize the typeset ink text elements into one or more categories of the structured content;
   determine a second font size for each of the typeset ink text elements based on the first font size of each typeset ink text element of the respective category;
   detect a second input as a digital ink non-text element;
   determine whether the second input is associated with at least the plurality of digital ink text elements of the structured content;
   assign, based on a determination that the second input is associated with at least the plurality of digital ink text elements of the structured content, a typeset ink non-text element corresponding to the second input detected as the digital ink non-text element to the category associated with the second font size; and cause display of, on a display associated with the respective computing device, the plurality of typeset ink text elements, surrounded by the typeset ink non-text element assigned to the category associated with the second font size, at the respective determined second font sizes.

2. A system as claimed in claim 1, wherein the typeset ink text elements are categorized based on the dimensional information of the corresponding digital ink text elements.

3. A system as claimed in claim 2, wherein the typographical information includes the x-height of the digital ink text elements.

4. A system as claimed in claim 1, wherein the dimensional information is further of one or more of the typeset ink non-text elements corresponding to one or more of the digital ink non-text elements of the structured content related to one or more of the digital ink text elements, the at least one non-transitory computer readable medium configured to:

calculate each first font size of one or more of the typeset ink text elements corresponding to the one or more of the digital ink text elements by comparing a first text size calculated from the dimensional information of the respective one or more of the digital ink text elements and a second text size calculated from the dimensional information of the respective one or more of the typeset ink non-text elements.

5. A system as claimed in claim 4, wherein the dimensional information includes geometrical information of the typeset ink non-text elements.

6. A system as claimed in claim 5, wherein:

at least part of at least one of the one or more of the digital ink text elements is contained within the related digital ink non-text element; and the first font size of the corresponding typeset ink text element is calculated so that the typeset ink text element is fully contained by the corresponding typeset ink non-text element.

7. A method for managing typesetting of digital ink structured content on a computing device, the computing device comprising a processor and at least one non-transitory computer readable medium for recognizing handwriting input under control of the processor, the method comprising:

detecting one or more inputs forming at least a plurality of digital ink text elements of structured content;

determining dimensional information of at least the plurality of digital ink text elements of structured content;
wherein the dimensional information comprises geometrical information and typographical information of at least the plurality of digital ink text elements of structured content;

calculating a first font size for each of a plurality of typeset ink text elements respectively corresponding to the digital ink text elements based on the dimensional information;

categorizing the typeset ink text elements into one or more categories of the structured content;

determining a second font size for each of the typeset ink text elements based on the first font size of each typeset ink text element of the respective category;

detecting a second input as a digital ink non-text element;

determining whether the second input is associated with at least the plurality of digital ink text elements of the structured content;

assigning, based on a determination that the second input is associated with at least the plurality of digital ink text elements of the structured content, a typeset ink non-text element corresponding to the second input detected as the digital ink non-text element to the category associated with the second font size; and displaying, on a display associated with the respective computing device, the plurality of typeset ink text elements, surrounded by the typeset ink non-text element assigned to the category associated with the second font size, at the respective determined second font sizes.

8. A method as claimed in claim 7, wherein the typeset ink text elements are categorized based on the dimensional information of the corresponding digital ink text elements.

9. A method as claimed in claim 8, wherein the typographical information includes the x-height of the digital ink text elements.

10. A method as claimed in claim 7, wherein the dimensional information is further of one or more of the typeset ink non-text elements corresponding to one or more of the digital ink non-text elements of the structured content related to one or more of the digital ink text elements, the method comprising:

calculating each first font size of one or more of the typeset ink text elements corresponding to the one or more of the digital ink text elements by comparing a first text size calculated from the dimensional information of the respective one or more of the digital ink text elements and a second text size calculated from the dimensional information of the respective one or more of the typeset ink non-text elements.

11. A method as claimed in claim 10, wherein the dimensional information includes geometrical information of the typeset ink non-text elements.

12. A method as claimed in claim 11, wherein:

at least part of at least one of the one or more of the digital ink text elements is contained within the related digital ink non-text element; and the first font size of the corresponding typeset ink text element is calculated so that the typeset ink text element is fully contained by the corresponding typeset ink non-text element.

13. A non-transitory computer readable medium having a computer readable program code embodied therein, said computer readable program code adapted to be executed to implement a method for managing typesetting of digital ink structured content on a computing device, the computing device comprising a processor and at least one non-transitory computer readable medium for recognizing handwriting input under control of the processor, the method comprising:

detecting one or more inputs forming at least a plurality of digital ink text elements of structured content;

determining dimensional information of at least the plurality of digital ink text elements of structured content;
wherein the dimensional information comprises geometrical information and typographical information of at least the plurality of digital ink text elements of structured content;

calculating a first font size for each of a plurality of typeset ink text elements respectively corresponding to the digital ink text elements based on the dimensional information;

categorizing the typeset ink text elements into one or more categories of the structured content;

determining a second font size for each of the typeset ink text elements based on the first font size of each typeset ink text element of the respective category;

detecting a second input as a digital ink non-text element;

determining whether the second input is associated with at least the plurality of digital ink text elements of the structured content;

assigning, based on a determination that the second input is associated with at least the plurality of digital ink text elements of the structured content, a typeset ink non-text element corresponding to the second input detected as the digital ink non-text element to the category associated with the second font size; and displaying, on a display associated with the respective computing device, the plurality of typeset ink text elements, surrounded by the typeset ink non-text element assigned to the category associated with the second font size, at the respective determined second font sizes.

14. A method as claimed in claim 13, wherein the typeset ink text elements are categorized based on the dimensional information of the corresponding digital ink text elements.

15. A method as claimed in claim 14, wherein the typographical information includes the x-height of the digital ink text elements.

16. A method as claimed in claim 13, wherein the dimensional information is further of one or more of the typeset ink non-text elements corresponding to one or more of the digital ink non-text elements of the structured content related to one or more of the digital ink text elements, the method comprising:

calculate each first font size of one or more of the typeset ink text elements corresponding to the one or more of the digital ink text elements by comparing a first text size calculated from the dimensional information of the respective one or more of the digital ink text elements and a second text size calculated from the dimensional information of the respective one or more of the typeset ink non-text elements.

17. A method as claimed in claim 16, wherein the dimensional information includes geometrical information of the typeset ink non-text elements.

18. A method as claimed in claim 17, wherein:

at least part of at least one of the one or more of the digital ink text elements is contained within the related digital ink non-text element; and the first font size of the corresponding typeset ink text element is calculated so that the typeset ink text element is fully contained by the corresponding typeset ink non-text element.

* * * * *